(12) United States Patent
Okajima et al.

(10) Patent No.: US 7,634,140 B2
(45) Date of Patent: Dec. 15, 2009

(54) PATTERN FEATURE SELECTION METHOD, CLASSIFICATION METHOD, JUDGMENT METHOD, PROGRAM, AND DEVICE

(75) Inventors: Kenji Okajima, Tokyo (JP); Hitoshi Imaoka, Tokyo (JP); Masanobu Miyasita, Tokyo (JP)

(73) Assignee: NEC Corporation (JP)

( * ) Notice: Subject to any disclaimer, the term of this patent is extended or adjusted under 35 U.S.C. 154(b) by 584 days.

(21) Appl. No.: 10/505,903

(22) PCT Filed: Feb. 27, 2003

(86) PCT No.: PCT/JP03/02264

§ 371 (c)(1),
(2), (4) Date: Aug. 26, 2004

(87) PCT Pub. No.: WO03/073381

PCT Pub. Date: Sep. 4, 2003

(65) Prior Publication Data

US 2005/0169516 A1    Aug. 4, 2005

(30) Foreign Application Priority Data

Feb. 27, 2002    (JP) .............................. 2002-051113

(51) Int. Cl.
*G06K 9/62* (2006.01)
(52) U.S. Cl. ..................... 382/224; 382/159; 382/290
(58) Field of Classification Search .................. 382/159, 382/224, 190
See application file for complete search history.

(56) References Cited

U.S. PATENT DOCUMENTS 5,497,430 A * 3/1996 Sadovnik et al. ............ 382/156

(Continued)

FOREIGN PATENT DOCUMENTS

JP    61-75486    4/1986

(Continued)

OTHER PUBLICATIONS

Battiti, Roberto, "Using Mutual Information for Selecting Features in Supervised Neural Net Learning", 8357 IEEE Transactions on Neural Networks 5(1994) Jul., No. 4, New York, US, 1994.

(Continued)

*Primary Examiner*—Charles Kim
*Assistant Examiner*—Stephen R Koziol
(74) *Attorney, Agent, or Firm*—Hayes Soloway P.C.

(57) ABSTRACT

Feature decision means (303) decides a set of features appropriate for pattern identification from a plenty of feature candidates generated by feature candidate generation means (302) by using learning patterns stored in learning, pattern storage means (301). The feature decision means (303) successively decides features according to a reference of information maximization under the condition that the decided feature is known while adding an effective noise to the learning pattern and performs information amount calculation approximately and at a high speed while merging the learning patterns into a set of N elements when required. As a result, it is possible to automatically create a feature set appropriate for pattern identification of a high performance without requiring enormous learning. Moreover, by using a transition table (305) containing transitions between sets, it is possible to perform pattern judgment with a high efficiency.

59 Claims, 11 Drawing Sheets

U.S. PATENT DOCUMENTS

| | | | |
|---|---|---|---|
| 5,675,710 A * | 10/1997 | Lewis | 706/12 |
| 6,128,608 A * | 10/2000 | Barnhill | 706/16 |
| 6,208,758 B1 * | 3/2001 | Ono et al. | 382/190 |

FOREIGN PATENT DOCUMENTS

| | | |
|---|---|---|
| JP | 63-79192 | 4/1988 |
| JP | 64-65680 | 3/1989 |
| JP | 1-321591 | 12/1989 |
| JP | 4-84277 | 3/1992 |
| JP | 4-112391 | 4/1992 |
| JP | 4-256087 | 9/1992 |
| JP | 5-108890 | 4/1993 |
| JP | 6-4673 | 1/1994 |
| JP | 6-251156 | 9/1994 |
| JP | 6-162198 | 9/1996 |
| JP | 9-245124 | 9/1997 |
| JP | 9-288492 | 10/1997 |
| JP | 9-305574 | 11/1997 |
| JP | 8-106295 | 5/1998 |
| JP | 10-320402 | 12/1998 |
| JP | 2000-122690 | 4/2000 |
| JP | 2001-34709 | 2/2001 |
| WO | WO 99/67728 | 12/1999 |
| WO | WO 01/31579 | 5/2001 |

OTHER PUBLICATIONS

"Optimal Feature Extraction by Visual Cortical Neurons" Okajima, NEC Fundamental Research Laboratories, p. 133-136, 1999.

"Neurocomputer" edited by Kaoru Nakamura, Gijutsu-Hyohron Co. Ltd. 1989.

"Parallel Distributed Processing" Rumelhart et al., MIT Press, pp. 317-329.

"C4.5: Programs for Machine Learning" Quinlan, 1993, pp. 17-25.

* cited by examiner

| q | $C_1$ | $C_2$ | $C_3$ | $C_4$ | $C_5$ | | $C_{n-1}$ | $C_n$ |
|---|---|---|---|---|---|---|---|---|
| 1 | 1 | 1 | 0 | * | * | | * | * |
| 1 | 1 | 0 | 1 | 1 | 1 | | 1 | 1 |
| 0 | 0 | 0 | 0 | 1 | * | | * | * |
| 0 | 0 | 0 | 1 | 0 | 0 | | 0 | 0 |
| 1 | 1 | 0 | 1 | 0 | 1 | | 0 | 1 |
| 0 | 1 | 1 | 1 | * | * | | * | * |
| 0 | 0 | 0 | 0 | 1 | 0 | | 0 | * |

PATTERN FEATURE SELECTION METHOD, CLASSIFICATION METHOD, JUDGMENT METHOD, PROGRAM, AND DEVICE

TECHNICAL FIELD

The present invention relates to a feature selection method, a classification method, a judgment method, a program, and a device that are used for a pattern used for image identification or the like.

BACKGROUND ART

A method on the basis of a discriminant analysis method, a method on the basis of a principal component analysis method, and so forth, have been known and widely used, as a method for deciding a feature used for identifying a pattern from a learning-pattern set (see Japanese Unexamined Patent Application Publication Nos. 9-258492, 4-256087, and 1-321591, for example). However, since every feature decided according to each of the above-described methods is linear, the performance of the methods is limited.

On the other hand, a method using a neural network and especially a method using a combination of an error-backward-propagation learning method and the neural network are known, as a method using a nonlinear feature (see "Neurocomputer" edited by Kaoru NAKAMURA, Gijutsu-Hyohron Co., Ltd. 1989, or D. E. Rumelhart, "Parallel Distributed Processing", MIT Press, 1986, for example). According to the above-described methods, it becomes possible to make a neuron of an intermediate layer learn the nonlinear feature suitable for pattern identification. However, the above-described methods have the following problems. That is to say, it takes enormous time for learning in the case of a problem of great difficulty and the performance of the neural net is significantly affected by the number of the intermediate-layer neurons. Further, there is no general method for determining the most appropriate number of the intermediate-layer neurons in advance.

Further, methods including ID3, C4.5, and so forth, for determining a classification rule at each node of a decision tree by the mutual-information maximization standards are known as a method for performing pattern identification (classification) by using the decision tree (see Japanese Unexamined Patent Application Publication Nos. 2000-122690 and 61-75486, J. R. Quinlan, "C4.5: Programs for Machine Learning", 1993) The learning time required for these methods is shorter than in the case of the above-described methods using the neural network. On the other hand, there is a perception that the performance of these methods is inferior to that of the neural-network methods, in general. For example, the ability to identify a pattern other than the learning patterns (generalization ability) of these methods is not at adequate levels.

DISCLOSURE OF INVENTION

Accordingly, the object of the present invention is to provide a pattern judgment method for achieving high-performance pattern identification without requiring enormous learning, and a feature selection method and a pattern classification method that are provided, as a precondition for the pattern judgment method.

According to a first aspect of the present invention, there is provided a feature selection method used for a system including learning-pattern storage means for storing and maintaining a learning pattern including class information, feature-candidate generation means for generating a plurality of feature candidates, and feature decision means for deciding a set of features suitable for pattern identification from among the plurality of feature candidates generated by the feature-candidate generation means, wherein the feature decision means decides a predetermined feature candidate having a largest amount of mutual information from the class information of the set of the learning patterns, as a first feature of the feature set, by calculating a feature value of each of the learning patterns corresponding to the feature candidates, predetermined feature candidates having a largest amount of mutual information from the class information of the set of the learning patterns under the condition that the decided features are known, as next features of the feature set in sequence.

According to a modification of the first aspect of the present invention, there is provided a feature selection method used for a system including learning-pattern storage mean, for storing and maintaining a learning pattern including class information, feature-candidate generation means for generating a plurality of feature candidates, and feature decision means for deciding a feature set suitable for pattern identification from among the plurality of feature candidates generated by the feature-candidate generation means, wherein the feature decision means prepares a predetermined number of sets for causing the learning patterns to transition according to the feature values, decides a predetermined feature candidate having a largest amount of mutual information from the class information of the set of the learning patterns, as a first feature of the feature set, by calculating the feature value of each of the learning patterns corresponding to the feature candidates, adds weights to each of the learning patterns according to the determined feature, distributes the learning patterns, and causes the learning patterns to transition to a set corresponding to the determined feature in sequence, and decides predetermined feature candidates having a largest amount of mutual information between the feature value of the learning pattern corresponding to the feature candidate and the class information of the learning pattern in sequence, as next features of the feature set, under the condition that information about the set including the learning patterns and the decided feature are known.

According to a second aspect of the present invention, there is provided a method for classifying patterns used for a system including learning-pattern storage means for storing and maintaining the learning patterns used for learning, feature-candidate generation means for generating a plurality of feature candidates, feature decision means for deciding a feature set suitable for pattern identification from among the plurality of feature candidates generated by the feature-candidate generation means, feature storage means for storing and maintaining the feature set decided by the feature decision means, and classification-table generation means for generating a classification table, wherein the classification-table generation means calculates a feature value of each of the learning patterns by using the feature set decided according to the above-described selection method, and classifies the learning patterns according to the classification table including the feature values of the learning patterns and class information.

According to a third aspect of the present invention, there is provided a method for pattern judgment used for a system including pattern input means for inputting patterns, feature extraction means for extracting features from the patterns, pattern judgment means for judging the patterns based on the features, and feature storage means for storing and maintaining a decided feature set, wherein the feature extraction means calculates a feature value of each of the input patterns by using the feature set decided according to the above-described feature selection methods, and performs the pattern judgment based on the calculated result.

According to a modification of the third aspect of the present invention, there is provided a method for pattern judgment used for a system including pattern input means for inputting patterns, feature extraction means for extracting features from the patterns, pattern judgment means for judging the patterns based on the features, and feature storage means for storing and maintaining a decided feature set, wherein the feature extraction means calculates a feature probability for each of the input patterns, the feature probability indicating a probability that the feature of a concerned rank becomes a predetermined value by using the feature set determined according to the above-described feature selection methods, wherein the pattern judgment means causes the input patterns to transition based on the feature probabilities of the input patterns and a transition table that stores sets to which learning patterns belong at the time where each feature is decided in sequence, and performs the pattern judgment by calculating a probability that each of the input patterns has predetermined class information based on a route of the transition.

According to a fourth aspect of the present invention, there is provided a program run by a computer forming a system including learning-pattern storage means for storing and maintaining a learning pattern including class information, feature-candidate generation means for generating a plurality of feature candidates, and feature decision means for deciding a set of features suitable for pattern identification from among the plurality of feature candidates generated by the feature-candidate generation means, wherein the program performs feature selection by making the computer perform the steps of deciding a predetermined feature candidate having a largest amount of mutual information from the class information of the set of the learning patterns, as a first feature of the feature set, by calculating a feature value of each of the learning patterns corresponding to the feature candidates, and deciding predetermined feature candidates having a largest amount of mutual information between the feature value of the learning pattern corresponding to the feature candidate and the class information of the learning pattern in sequence, as next features of the feature set, under the condition that the decided features are known.

According to a modification of the fourth aspect of the present invention, there is provided a program run by a computer forming a system including learning-pattern storage means for storing and maintaining a learning pattern including class information, feature-candidate generation means for generating a plurality of feature candidates, and feature decision means for deciding a feature set suitable for pattern identification from among the plurality of feature candidates generated by the feature-candidate generation means, wherein the program performs feature selection by making the computer perform the steps of preparing a predetermined number of sets for causing the learning patterns to transition according to the feature values, deciding a predetermined feature candidate having a largest amount of mutual information from the class information of the set of the learning patterns, as a first feature of the feature set, by calculating the feature value of each of the learning patterns corresponding to the feature candidates, adding a weight to each of the learning patterns according to the decided feature, distributing the learning patterns, and causing the learning patterns to transition to a set corresponding to the decided feature in sequence, and deciding predetermined feature candidates having a largest amount of mutual information between the feature value of the learning pattern corresponding to the feature candidate and the class information of the learning pattern in sequence, as next features of the feature set, under the condition that information about the set including the learning patterns and the decided feature are known.

According to another modification of the fourth aspect of the present invention, there is provided a program run by a computer forming a system including learning-pattern storage means for storing and maintaining learning patterns used for learning, feature-candidate generation means for generating a plurality of feature candidates, feature decision means for deciding a set of features suitable for pattern identification from among the plurality of feature candidates generated by the feature-candidate generation means, feature storage means for storing and maintaining the feature set decided by the feature decision means, and classification-table generation means for generating a classification table, wherein the program performs learning-pattern classification by making the computer perform the steps of calculating a feature of each of the learning patterns by using the feature set decided by running the above-described programs, and classifying the learning patterns according to the classification table including the feature values of the learning patterns and class information.

According to still another modification of the fourth aspect of the present invention, a program run by a computer forming a system including pattern input means for inputting patterns, feature extraction means for extracting features from the patterns, pattern judgment means for judging the patterns based on the features, and feature storage means for storing and maintaining a decided feature set, wherein the program makes the computer perform a step of calculating a feature value of each of the input patterns by using the feature set decided by running the above-described programs, whereby pattern judgment is performed based on the performance result.

According to still another modification of the fourth aspect of the present invention, there is provided a program run by a computer forming a system including pattern input means for inputting patterns, feature extraction means for extracting features from the patterns, pattern judgment means for judging the patterns based on the features, and feature storage means for storing and maintaining a decided feature set, wherein the program judges the input patterns based on a set to which the input patterns belong by making the computer perform the steps of calculating a feature value of each of the Input patterns by using the feature set decided by running the above-described programs, and causing the input patterns to transition based on the feature values of the input patterns and a transition table that stores sets to which the learning patterns belong at the time where each feature is decided in sequence by running the program according to the modification of the fourth aspect.

According to still another modification of the fourth aspect of the present invention, there is provided a program run by a computer forming a system including pattern input means for inputting patterns, feature extraction means for extracting features from the patterns, pattern judgment means for judging the patterns based on the features, and feature storage means for storing and maintaining a decided feature set, wherein the program makes the computer perform the steps of calculating a feature probability for each of the input patterns, the feature probability indicating a probability that the feature of a concerned rank becomes a predetermined value by using the feature set decided by running the above-described programs, causing the input patterns to transition based on the feature probabilities of the input patterns and a transition table that stores sets to which learning patterns belong at the time where each feature is decided in sequence by running the program according to the modification of the fourth aspect, and calculating a probability that each of the input patterns has a predetermined class information based on a route of the transition, whereby the input patterns are judged based on the calculation result.

According to a fifth aspect of the present invention, there is provided a pattern learning system for maintaining the above-described programs so that the programs can be run, so as to perform learning-pattern-feature selection.

According to a sixth aspect of the present invention, there is provided a pattern classification system for maintaining the above-described programs so that the programs can be run, so as to perform learning-pattern classification.

According to a seventh aspect of the present invention, there is provided a pattern judgment system for maintaining the above-described programs so that the programs can be run, so as to perform input-pattern judgment.

BEST MODES FOR CARRYING OUT THE INVENTION

Embodiments of the present invention will now be described with reference to the attached drawings.

Figure 1:
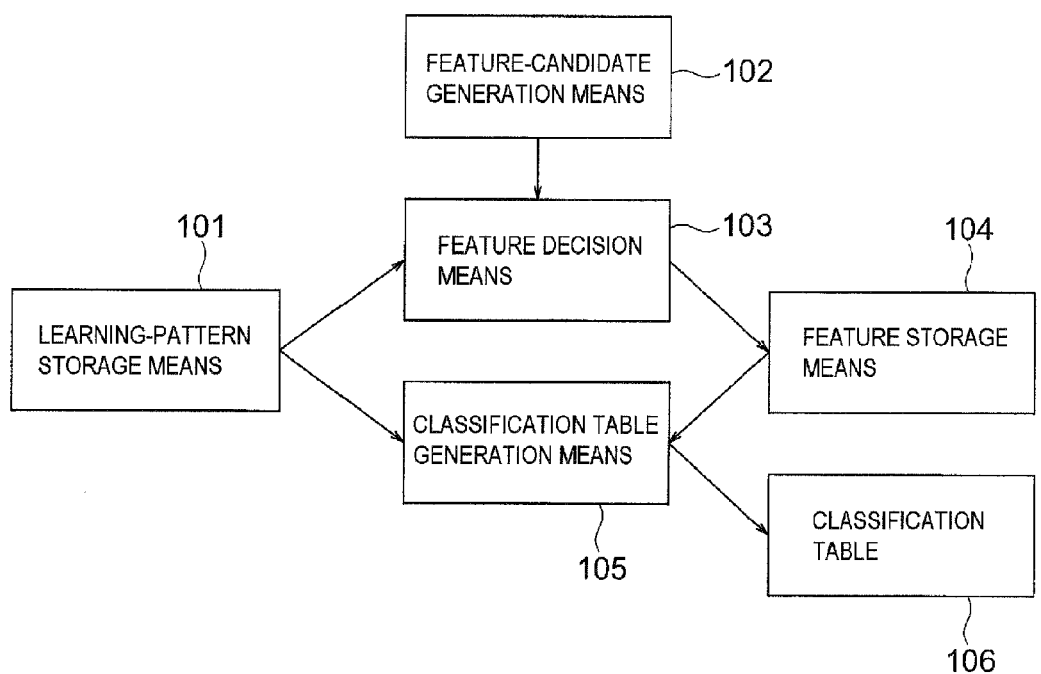
FIG. 1 is a block diagram illustrating the configuration of a system for performing a feature selection method according to a first embodiment of the present invention.

FIG. 1 is a block diagram illustrating a system configuration for a feature selection method according to a first embodiment of the present invention. Referring to this drawing, learning-pattern storage means 101, feature-candidate generation means 102, feature decision means 103, feature storage means 104, classification-table generation means 105, and a classification table 106 are shown.

The learning-pattern storage means 101 are used for storing and maintaining a predetermined number of learning patterns used for learning. The feature-candidate generation means 102 is used for generating feature candidates from a predetermined number of feature parameter sets in sequence. The feature decision means 103 decides a feature set that is most suitable for pattern identification from among the feature candidates generated by the feature-candidate generation means.

The feature storage means 104 is used for storing and maintaining the feature set decided by the feature decision means 103. The classification-table generation means 105 is used for generating the classification table 106 for performing pattern judgment by using the feature set decided by the feature decision means 103.

Figure 2:
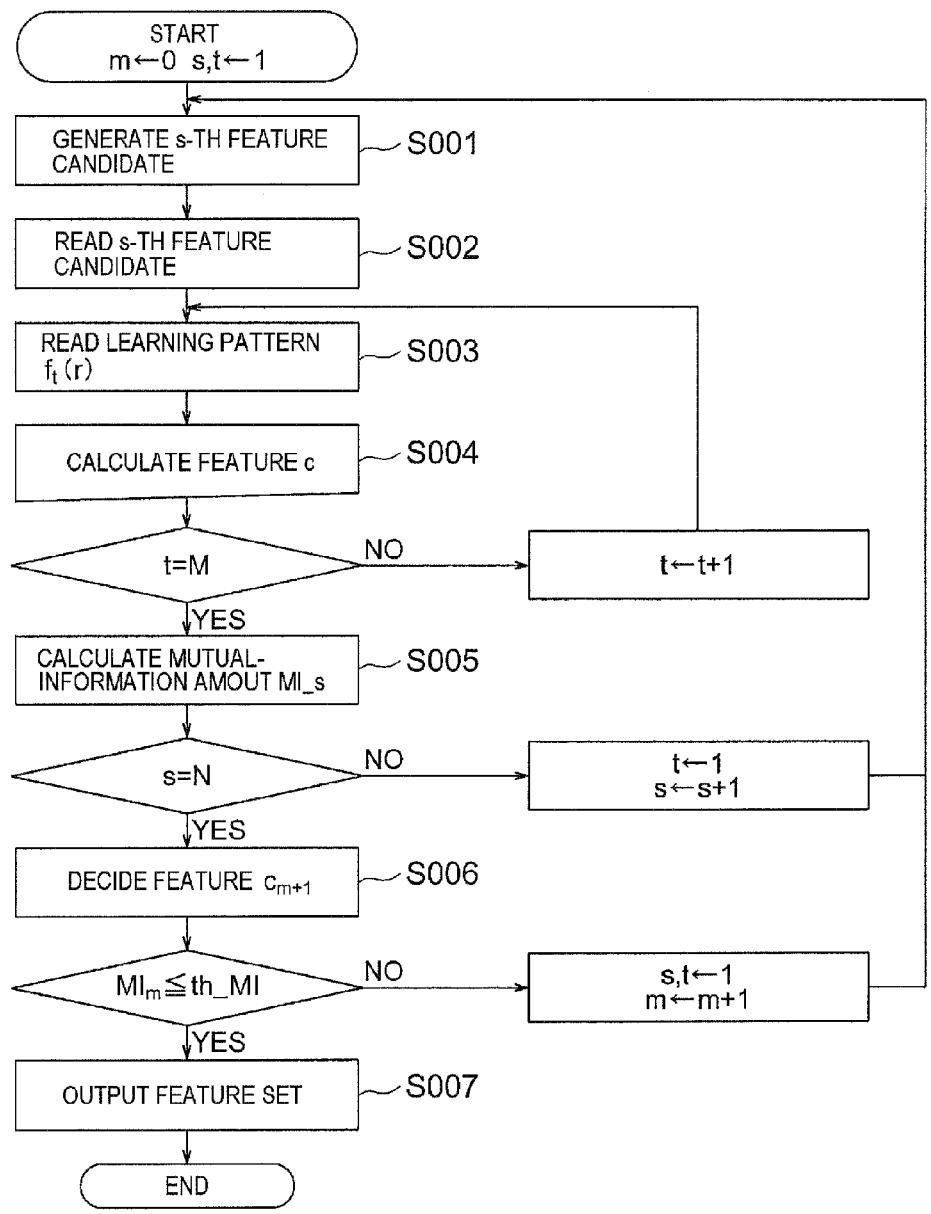
FIG. 2 is a flowchart illustrating the feature selection method according to the first embodiment of the present invention.

Next, procedural steps of a feature selection method according to the present invention will be described with reference to the attached drawings. FIG. 2 is a flowchart illustrating the flow of processing for the feature selection method of the present invention.

Referring to FIGS. 1 and 2, the feature-candidate generation means 102 generates a feature candidate (step S001). More specifically, the feature-candidate generation means 102 selects the s-th (where s=1 to N and s starts from one) feature-parameter set ($k\_s$, $r_0\_s$, $\sigma\_s$, and $th\_s$) from among a plenty of (N) feature-parameter sets that had been prepared and substitutes the s-th feature-parameter set into ($k$, $r_0$, $\sigma$, and $th$). Subsequently, a complex Gabor function Gab and a Gaussian function G shown in the following equations defined by parameters $k$, $r_0$, and $\sigma$ are generated.

$$Gab(r; k, r_0, \sigma) = \exp(ik(r - r_0) - |r - r_0|^2 / (2\sigma^2)) \quad \quad (1)$$
$$G(r; r_0, \sigma) = \exp(-|r - r_0|^2 / (2\sigma^2) / (2\pi\sigma^2))$$

Here, an equation $r = (x, y)$ indicates a position vector and an equation $i^2 = -1$ holds. The feature-candidate generation means 102 transmits the complex Gabor function Gab, the Gaussian function G, a threshold parameter th, and a feature-candidate identification number s shown in Equations (1) to the feature decision means 103 (step S002).

The learning-pattern storage means 101 transmits a combination of predetermined M different learning patterns (image) $f_t(r)$ (where t=1 to M) and class $q_t$ (where t=1 to M) to which each learning pattern belongs to the feature decision means 103 (step S003). In this embodiment, the number of classes is determined to be two (q=0 or 1) for simplifying the description. Of course, this method of the present invention can be used for the case where the number of classes is three or more.

The feature decision means 103 calculates a feature c according to the following equations by using feature candidates (the complex Gabor function, the Gaussian function, and other parameters shown in Equations (1)) for the learning patterns sequentially transmitted from the learning-pattern storage means 101 (step S004). Here, the t-th learning pattern is determined to be $f_t(r)$ and the above-described calculation is repeated for each of the entire (M) learning patterns.

$$\alpha = \left|\sum_r f_t(r)Gab(r; k, r_0\sigma)\right|^2 / \sum_r f_t(r)^2 G(r; r_0, \sigma) \quad (2)$$
$$c = 1 \text{ if } \alpha \geq th$$
$$c = 0 \text{ otherwise}$$

The denominator of an upper equation of Equations (2) indicates a normalization (standardization) factor for reducing variance of value a due to the pattern size (the image brightness). This equation of the denominator can be replaced by a normalization factor in another form. Further, the above-described normalization factor can be omitted according to the type of a pattern to be handled.

Where the feature c is calculated for each learning pattern by using the s-th feature candidate (feature-parameter set) in the above-described manner, the feature decision means 103 then calculates the mutual-information amount MI obtained from the s-th feature candidate according to the following equations. The feature decision means 103 stores the calculated mutual-information amount MI with the feature-candidate identification number s (step S005).

$$MI[Q; C] = H[Q] - \langle H[Q|c]\rangle_c \quad (3)$$

where $$H[Q] = -\sum_q P(q)\log P(q),$$
$$P(q) = M(q)/M$$
$$H[Q|c] = -\sum_q P(q|c)\log P(q|c),$$
$$P(q|c) = M(q, c)/M(c)$$

Here, reference character Q indicates a set of classes {q=0, q=1} and reference character M indicates the total number of learning patterns. Further, reference characters M(q) indicate the total number of learning patterns belonging to class q and reference characters M(c) indicate the total number of learning patterns whose features are represented by c, and reference characters M(q and c) indicates the total number of learning patterns that have features represented by c and that belong to class q.

$\langle\rangle_c$ shown in Equations (3) indicates an averaging operation relating to c. That is to say, the following equations hold.

$$\langle H[Q|c]\rangle_c = -\sum_c P(c)H[Q|c], P(c) = M(c)M$$

According to the above-described operations, the next (s+1)-th feature candidate is transmitted from the feature-candidate generation means, whereby operations similar to the above-described operations are repeated (steps S002 to S005). Where the mutual-information amount corresponding to the entire (N) feature candidates is calculated in the above-describe manner, the feature decision means 103 compares the mutual-information amount obtained from one of the feature candidates to that obtained from another. Then, the feature decision means 103 determines a feature candidate from which a largest mutual-information amount (MaxMI [Q;C]) can be obtained to be a first feature of a feature set to be determined (step S006).

When the first feature is determined in the above-described manner, the feature decision means 103 determines a second feature. The feature decision means 103 receives feature candidates in sequence from the feature-candidate generation means 102 in the above-described manner (step S002) and calculates the feature c for each learning pattern (steps S003 and S004). This operation can be replaced by the following operation. That is to say, the result of calculation for the feature c performed at step S004 for determining the above-described first feature is stored and maintained according to the amount of available storage so that the feature decision means 103 reads the details of the stored and maintained data. When the feature c is calculated for each learning pattern by using the s-th feature-parameter set, the feature decision means calculates information amount $MI_2$ obtained from the s-th feature candidate according to the following equations and stores the calculation result and the feature-candidate identification number s under the condition that the first feature $c_1$ that had already been determined is known (step S005).

$$MI_2[Q; C|C_1] = \langle H[Q|c_1]\rangle_{c1} - \langle H[Q|(c, c_1)]\rangle_{C1,C} \quad (4)$$

where $$H[Q|c_1] = -\sum_q P(q|c_1)\log P(q|c_1),$$
$$P(q|c_1) = M(q, c_1)/M(c_1)$$
$$H[Q|c, c_1] = -\sum_q P(q|c, c_1)\log P(q|c, c_1),$$
$$P(q|c, c_1) = M(q, c, c_1)/M(c, c_1)$$

Here, reference characters ($Mc_1$) indicate the total number of learning patterns whose first feature is represented by $c_1$. Reference characters $M(q, c_1)$ indicate the total number of learning patterns that have a first feature represented by c, and that belong to class q. Reference characters $M(c, c_1)$ indicate the total number of learning patterns that have a feature represented by c and a first feature represented by $c_1$. Reference characters $M(q, c, c_1)$ indicate the total number of learning patterns that have a feature represented by c and a first feature represented by $c_1$, and that belong to class q.

According to the above-described operations, the next (s+1)-th feature candidate is transmitted from the feature-candidate generation means, whereby the same operations are repeated (steps S002 to S005). Where the mutual-information amount corresponding to the entire (N) feature candidates is calculated in the above-describe manner, the feature decision means 103 compares conditional mutual-information amount $MI_2$ obtained from one of the feature candidates to that obtained from another. Then, the feature decision means 103 determines a feature candidate from which a largest mutual-information amount can be obtained to be a second feature of a feature set to be determined (step S006).

Subsequently, where the m-th feature is determined, the feature c of the (m+1)-th feature adopts a feature candidate that makes an evaluation function $MI_{m+1}$ shown in the following equation rise to a maximum value.

$$MI_{m+1}[Q;C|C_1,C_2,\ldots C_m] = \langle H[Q|c_1, c_2, \ldots c_m]\rangle_{(c_1, c_2, \ldots c_m)} - \langle H[Q|(c,c_1,c_2,\ldots C_m]\rangle_{(c_1,c_2,\ldots c_m,c)} \quad (5)$$

The above-described function $MI_{m+1}$ indicates the information amount obtained from the feature c under the condition that the features up to the m-th feature (c1, C2, ... $C_m$) are known. The above-described procedures are continuously performed until the amount of obtained information (the amount of appended information) becomes smaller than a prepared threshold value MI_th even though a new feature is selected. For example, where the threshold value is determined to be zero, the above-described procedures are repeated for determining the next feature until the value of the amount of obtained information (the amount of appended information) becomes zero, that is to say, discontinue requirements are fulfilled.

Where the discontinue requirements are fulfilled, the feature-decision procedures are finished. Each of parameters of the determined feature set is stored in the feature storage means 104 (step S007).

The following configuration for decreasing the number of feature candidates generated by the feature-candidate generation means can be provided, as a modification of the above-described feature selection method. For example, for each complex Gabor function, an in-class mean value of values a calculated according to Equations (2) is determined in advance for each of a class for which an equation q=0 holds and a class for which an equation q=1 holds. Then, a threshold value (th_s) is fixed, so as to be an intermediate value of these two in-class mean values. Further, the following configuration can be proposed. That is to say, where the mutual-information amount MI is calculated for each complex Gabor function according to Equations (3) for determining the first feature, a threshold value (th_s) for giving a maximum MI value to each feature candidate may be stored, and the threshold value (th_s) is fixed, as it is, in the case where the second feature and later are determined, for example.

Further, according to the above-described embodiment, the complex Gabor function is used, as a feature-extraction function forming the feature candidate. However, other feature-extraction function can be added to the complex labor function. Further, the feature candidate may include only other feature-extraction function, as required.

Further, the following modification is also preferable. That is to say, a subspace is generated for each class and an indicator for indicating a distance to the subspace is added to the feature candidate. Further, a weighted average luminance near a predetermined point, where the weighted average luminance is calculated by using a Gaussian function, or the weighted average luminance normalized by an average luminance calculated by using a Gaussian function having a spread larger than that of the above-described Gaussian function (that is, an indicator for indicating whether an area near the predetermined point is lighter or darker than an area around the predetermined point) can be added to the feature candidate. Otherwise, a standard feature used for pattern judgment can be added to the feature candidate.

Where the procedures for determining features are finished and the determined feature set is stored in the feature storage means 104, the classification table 106 (see FIG. 4) used for the pattern identification can be generated. Procedures for generating the classification table 106 performed by the classification-table generation means 105 started by predetermined means will be described as below.

First, the classification-table generation means 105 receives learning patterns from the learning-pattern storage means 101 and parameters of the feature set stored at the above-described step S007 from the feature storage means 104. (In the following description, n features in total are determined.) Then, the classification-table generation means 105 calculates the value of each of features ($c_1, c_2, \ldots c_n$) for each learning pattern according to Equations (2). Then, indicator 1 is added to the feature candidate, where a predetermined learning pattern belongs to the class where the equation q=1 holds, or indicator 0 is added to the feature candidate, where the predetermined learning pattern belongs to the class where the equation q=0 holds, and stored in the classification table. A feature vector ($c_1, c_2, \ldots c_n$) corresponding to the learning pattern is also stored in the classification table.

Although the above-described procedures allow for generating a classification table used for uniquely classifying the learning patterns, the use of a redundant item (don't-care item) is more preferable. For example, where a predetermined pattern can be classified by using the values of from first to the i-th features ($c_1, c_2, \ldots c_i$), the values of the i+1-st feature vector and later are replaced with a don't-care sign and stored.

Figure 3:
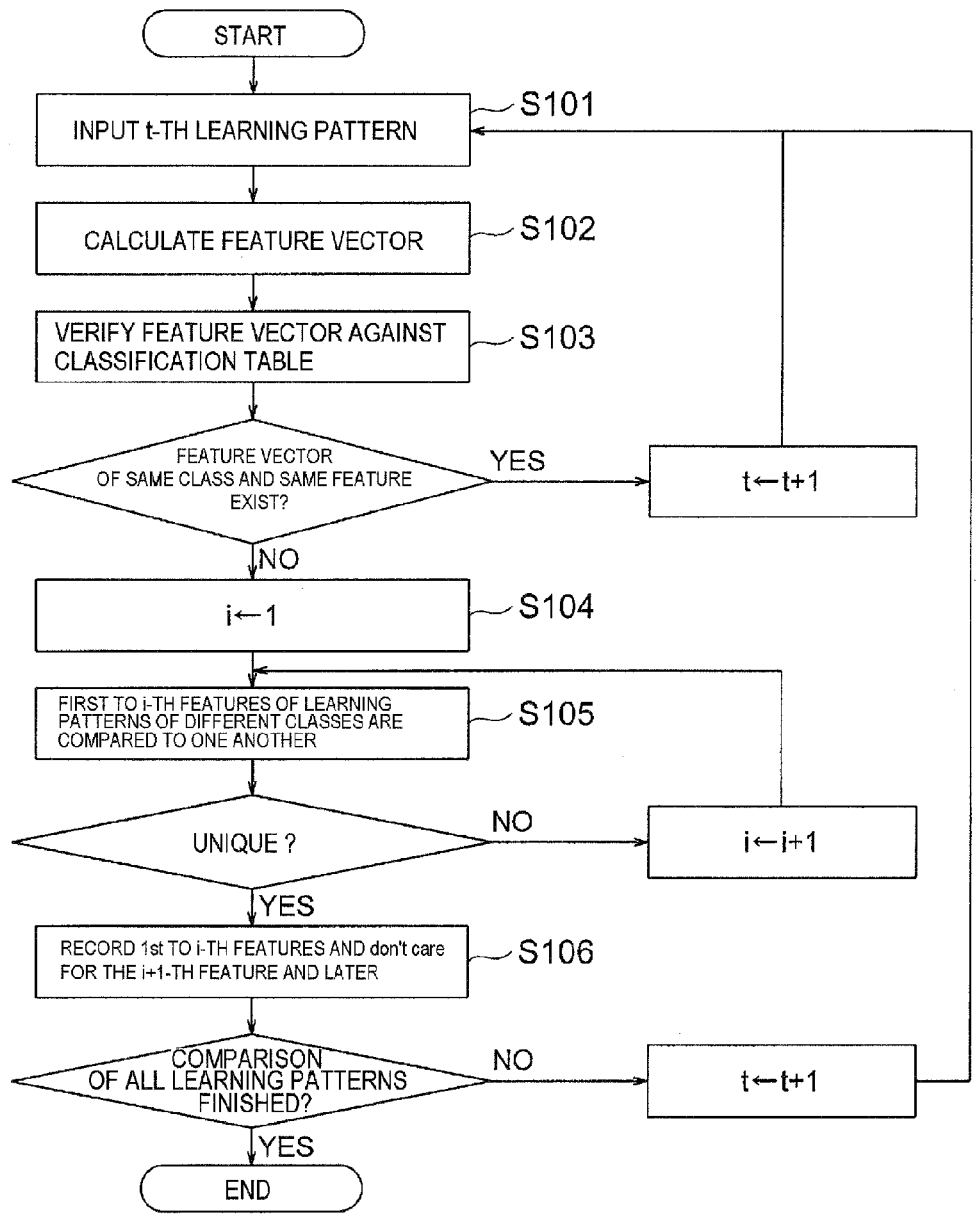
FIG. 3 is a flowchart illustrating an example classification-table generation process according to the present invention.

Procedures for generating a classification table by using the above-described redundant item (don't-care item) will be described with reference to the attached drawing. FIG. 3 is a flowchart showing an example process for generating the classification table according to the embodiment.

Referring to this drawing, first, the classification-table generation means 105 calculates the value of feature vectors ($c_1, c_2, \ldots c_n$) by using each of parameters of the determined feature set for each input learning pattern (steps S101 and S102).

It is determined whether or not a learning pattern having a feature vector that matches the above-described feature vector exists in the classification table (step S103). However, where the don't-care sign is written in the classification table, the value of a feature corresponding to the sign is determined to be the same as that of the above-described feature vector, whatever the value may be.

Where the learning pattern having the feature vector that matches the calculated feature vector exists in the classification table according to the above-described determination, the process returns to step S101 without storing the learning pattern. Then, the next learning pattern is input.

On the other hand, where no pattern having the feature vector that matches the calculated feature vector exists, increment variable i=1 is set (step S104) and the following process is performed. First, it is determined whether or not a learning pattern whose first to i-th features ($c_1, c_2, \ldots c_1$) match those of the learning patterns exists in the learning patterns belonging to a predetermined class (exemplification: q=1) other than the class (exemplification: q=0) to which the above-described learning pattern belongs (step S105).

Where there is no pattern that matches the above-described learning pattern, as a result, the values of from the first to i-th features ($c_1, c_2, \ldots c_i$) are recorded on the classification table with an indicator of the class (exemplification: q=0) to which this learning pattern belongs. Further, the don't-care sign is recorded for the values of the i+1-th feature vector and later (step S106). Then, the process returns to step S101, so as to input the next learning pattern.

On the contrary, where at least one learning pattern that matches this learning pattern exists, the increment variable i is incremented by one and the process returns to step S105. That is to say, the i-incrementing process is continuously performed until it becomes possible to identify oneself or others by using the values of features up to the i-th feature of input feature patterns.

The above-described processes are repeated until all learning patterns are input.

According to the above-described procedures, the entire learning patterns may not be classified. For example, learning patterns belonging to different classes may have the same feature vector. In this case, the number of learning patterns belonging to each class and that of learning patterns belonging to the other are counted. Then, the class having learning patterns more than those of the other class is determined to be a class indicated by the feature vector.

Of course, other methods can be adopted. For example, patterns whose features $c_1$ to $c_i$ match one another can be grouped (fragmentation) until only one pattern exists in each group. Then, each of the features of the i+1-st pattern and later are determined to be the don't-care item.

Figures 4, 5:
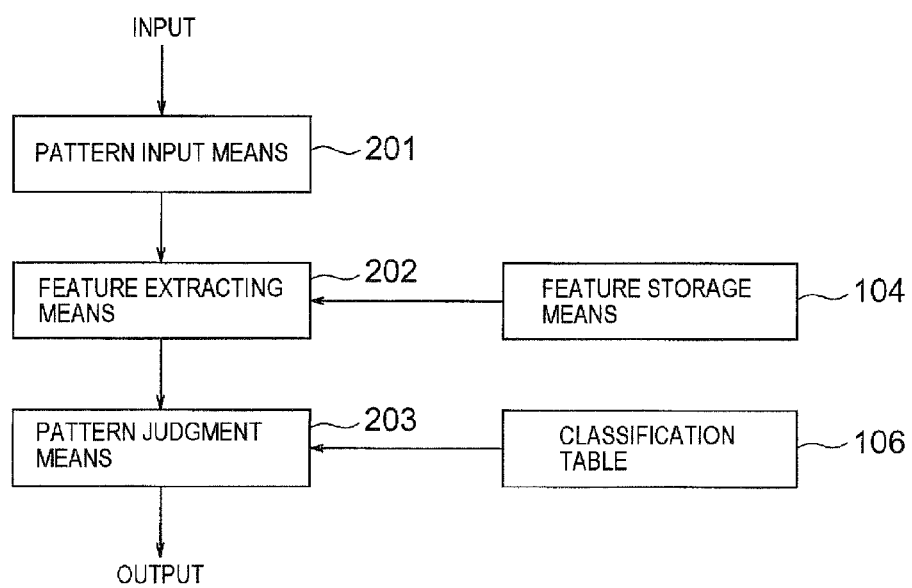
FIG. 4 shows an example classification table generated according to the present invention.
FIG. 5 is a block diagram showing the configuration of a system for performing a pattern judgment method according to the first embodiment of the present invention.

FIG. 4 illustrates an example classification table generated according to the present invention. Referring to this drawing, a table storing identification indicator (q) of the class of each learning pattern and feature vectors ($c_1, c_2, \ldots c_n$) is shown. Further, in this drawing, sign "*" indicates the don't-care item.

Next, a pattern-judgment method performed by using the above-described pattern-judgment table will be described with reference to the attached drawing.

FIG. 5 is a block diagram illustrating the flow of processing for a pattern-judgment method according to the present invention. Referring to this drawing, pattern input means 201, feature extraction means 202, and pattern judgment means 203 are shown. Further, the feature storage means 104 for storing and maintaining the determined feature set used by the feature extraction means 202 for extracting features and the classification table 106 that had already been generated, where the classification table 106 is used by the pattern judgment means 203 for judging patterns, are shown.

The pattern input means 201 is used for inputting a pattern from a predetermined medium. For example, even though an input pattern is not limited to character data, drawing data, speech data, and so forth. However, data on images of the face, finger print, retina of a person or data on the speech or the like of the person may be input, as information used for identifying the person, for example.

The feature extraction means 202 extracts the feature of the input pattern transmitted from the pattern input means 201 by using the determined feature set.

The pattern judgment means 203 judges information indicated by the input pattern based on features obtained by the feature extraction means 202.

The operation of the above-described pattern judgment method will be described, as below. First, the pattern input means 201 receives the input pattern from the predetermined medium and transmits the input pattern to the feature extraction means 202.

Then, the feature extraction means 202 calculates the feature vectors ($c_1, c_2, \ldots c_n$) according to Equations (2) by using the feature set (determined according to the above-described feature determination method) stored in the feature storage means 104 for the input pattern. Further, the feature extraction means 202 transmits the calculation result to the pattern judgment means 203.

The pattern judgment means 203 makes a search for a feature vector that matches the above-described feature vector by referring to the classification table 106. Then, the pattern judgment means 203 reads the identifier of a class recorded corresponding to the feature vector and outputs it as the judgment result. Where the don't-care sign is recorded on the classification table, the pattern judgment means 203 determines the value of a feature corresponding to the sign to be the same as that of the above-described feature vector, whatever the value may be.

Here, the difference between the present invention and a known method (ID 3, C4.5, and so forth) performed by using a decision tree will be described, so as to clearly define advantages of the present invention for determining pattern features and performing pattern judgment according to the above-described procedures.

ID 3 or the like and the present invention share a common method for determining a classification rule at each node of a decision tree according to the information-maximization criterion, However, according to the methods used for ID 3 and C4.5, the classification rule ("feature" is used in the present invention, as a word corresponding to the classification rule) is determined for each node. For example, where a second feature is determined after determining a first feature $c_1$ and where the value of the first feature $c_1$ can be either one or zero, the classification rule (feature) is differently determined according to the circumstances. However, in the present invention, the same features are determined for nodes of the same depth. That is to say, n-th features are the same as one another, which is a significant difference between the present invention and the known methods.

Of course, learning patterns can be entirely classified according to either way. However, there is a significant difference between the generalization ability, that is, the ability to identify an unlearned pattern of the present invention and that of the known method. Where both the trees have the same depth (n), for the sake of simplification, $2^n$ features are determined according to the method of ID3 or C4.5. However, n features are determined according to the method of the present invention. Therefore, the configuration of the present invention is simpler than those of the known methods. It should be noted that the difference between the number of determined features of the present invention and that of the known method increases exponentially, as the problem becomes more difficult and a deeper tree is required.

Incidentally, where classifiers having the same performance for a learning pattern are provided and where one of the classifiers has a configuration simpler than those of the others, the generalization ability of the classifier having the simpler configuration is greater than those of the other classifiers ("Ockham's razor"). Accordingly, the feature selection method and the pattern judgment method using the same according to the present invention can significantly increase the performance, most notably the generalization ability. That is to say, the generalization ability of the present invention becomes greater than those of the known method, Next, a second embodiment according to the present invention for adding an effective noise to a learning pattern will be described.

The system configuration of the second embodiment is substantially the same as that of the above-described first embodiment (see FIG. 1). Further, the flow of processing of the second embodiment is substantially the same as that of the above-described first embodiment (see FIGS. 2 to 5). Only the difference between the first and second embodiments will be described, as below.

According to this embodiment, a noise parameter $\sigma_n\_s$ (s=1 to N) is further set in advance, so as to be added to the plenty of (N) feature-parameter sets (k_s, $r_0\_s$, σ_s, and th_s) used by the feature-candidate generation means 102. Then, as Is the case with step S001 of the first embodiment, the feature-candidate generation means 102 substitutes the s-th (where s starts from one) feature-parameter set (k_s, $r_0\_s$, σ_th_s, and $\sigma_n\_s$) into (k, $r_0$, σ, th, and $\sigma_n$) and generates a complex Gabor function and a Gaussian function according to Equations (1). Then, the feature-candidate generation means 102 transmits the above-described complex Gabor function, Gaussian function, threshold parameter th, noise parameter $\sigma_n$, and the feature-candidate-identification number s to the feature decision means 103 (step S002 shown in FIG. 2).

The feature decision means 103 receives learning patterns in sequence from the learning-pattern storage means 101 (step S003 shown in FIG. 2) and calculates feature b for each learning pattern according to the following equations by using the above-described complex Gabor function and Gaussian function (step S004 shown in FIG. 2). Here, the t-th learning pattern is determined to be $f_t(r)$ (t=1 to M).

$$\left. \begin{aligned} a &= \left| \sum_r f_t(r) Gab(r; k, r_0, \sigma) \right|^2 / \sum_r f_t(r)^2 G(r; r_0, \sigma) \\ b &= Erf((a - th)/\sigma_n) \end{aligned} \right\} \quad (6)$$

Erf(x) shown in Equations (6) indicates an error function. This error function can be replaced by other non-linear function whose value is from zero to one inclusive, such as a Sigmoidal function.

Where the feature b is calculated for each learning pattern by using the s-th feature-parameter set in the above-described manner, the feature decision means 103 then calculates the mutual-information amount MI obtained from the s-th feature candidate in the following manner according to the above-described Equation (3) (step S005 shown in FIG. 2).

First, where the value of a feature calculated for a predetermined learning pattern according to the above-described Equations (6) is b ($0 \leq b \leq 1$), the value of a feature c for the predetermined learning pattern is one, where the probability value is b. However, the value of the feature c for the predetermined learning pattern is zero, where the probability value is (1−b). M(c) shown in Equations (3) can be replaced by an expected value of the total number of learning patterns whose features are represented by c. Similarly, M(q, c) can be replaced by an expected value of the total number of learning patterns that have features represented by c and that belong to class q. Subsequently, the mutual-information amount MI is calculated, Where the mutual-information amount is calculated for each of the entire feature candidates, the feature decision means 103 performs a comparison between the mutual-information amounts obtained from the feature candidates, as in the first embodiment. Then, the feature decision means 103 determines a feature candidate from which a largest mutual-information amount can be obtained to be a first feature of a feature set to be determined (step S006 shown in FIG. 2).

Subsequently, where the m-th feature is determined, the (m+1)-th feature $c_{m+1}$ is determined under the condition that features up to the m-th feature ($c_1, c_2, \ldots c_m$) are known so that the information amount $MI_{m+1}$ obtained from the feature c has a maximum value. However, as in the case where the above-described first feature is determined, various total numbers of learning patterns are replaced by expected values of various total number of learning patterns corresponding thereto for calculating the mutual-information amount. For calculating $MI_2$, for example, M(c, $c_1$) is replaced by an "expected value of the total number of learning patterns that have a feature represented by c, a first feature represented by $c_1$. Further, M(q, c, $c_1$) is replaced by an "expected value of the total number of learning patterns that have a feature represented by c and a first feature represented by $c_1$ and that belong to class q".

As in the first embodiment, the above-described procedures are continuously performed until the amount of obtained information (the amount of appended information) becomes smaller than a prepared threshold value even though a new feature is selected. Once the discontinue requirements are fulfilled, each of parameters of the determined feature set is stored in the feature storage means 104 (step S007 shown in FIG. 2).

Figure 6:
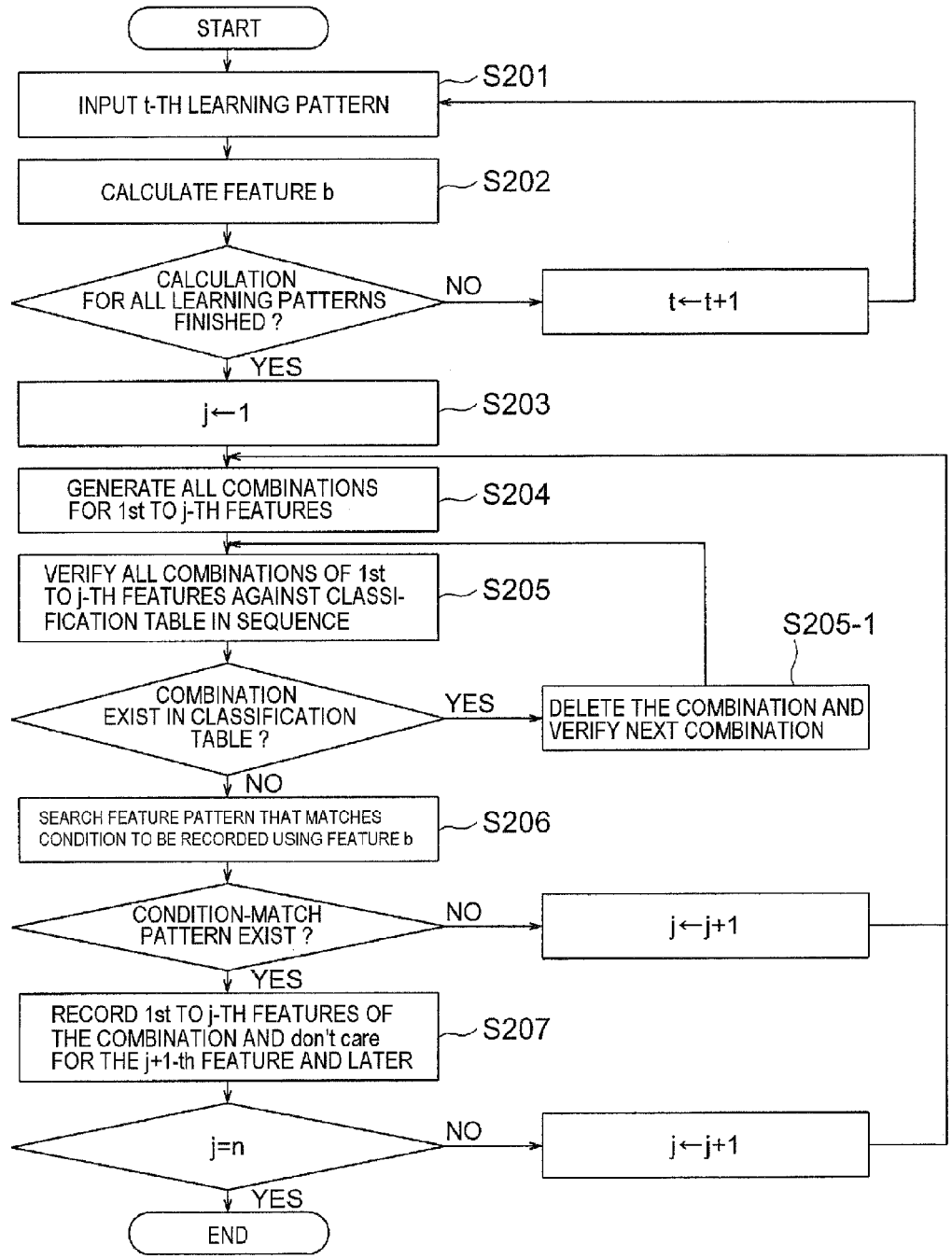
FIG. 6 is a flowchart illustrating another example classification-table generation process according to the present invention.

Next, procedures for generating another classification table according to the embodiment will be described with reference to the attached drawing, FIG. 6 is a flowchart showing an example process for generating the classification table according to the embodiment. Here, n features are determined by the feature decision means and the classification table is Initialized (cleared).

Referring to FIG. 6, first, the classification-table generation means 105 calculates features $b_s$ ($b_1, b_2, \ldots b_n$) according to Equations (6) by using each of parameters of the determined feature set for the learning patterns (steps S201 and S202). Where the features b, are calculated for the entire learning patterns, the classification-table generation means 105 determines the probability that the value of the s-th feature $c_s$ becomes one to be probability $b_s$ and the probability that the value of the s-th feature $c_s$ becomes zero to be probability ($1-b_s$). Further, the classification-table generation means 105 initializes the value of j to one and starts selecting patterns to be recorded on the classification table 106 (step S203).

First, the classification-table generation means 105 generates all possible combinations of from the first to j-th features ($c_1, c_2, \ldots c_j$) (step S204). Next, the classification-table generation means 105 verifies the entire combinations of from the first to j-th features against feature vectors that were recorded on the classification table 106 in sequence (step S205) and deletes any combination that matches the feature vector recorded on the classification table 106 of the entire combinations of from the first to J-th features (step S205-1). In this case, any feature for which the don't-care sign is recorded on the classification table 106 is handled as a feature that matches the recorded feature vector, whatever the feature value may be.

Then, the classification-table generation means 105 calculates expected values of the other feature patterns ($c_1, c_2, \ldots c_j$) by using the features $b_s$ calculated for the learning patterns, at step S202, and makes a search for a feature pattern that matches a condition to be recorded on the classification table 106 (step S206). More specifically, the classification-table generation means 105 selects suitable feature patterns ($C_1, c_2, \ldots c_j$) in sequence from among the other feature patterns and determines a predetermined feature pattern to be a pattern representing the class q, where the predetermined feature pattern fulfills the following requirements (1) and (2). According to requirement (1), the predetermined feature pattern is one of the above-described feature patterns, where an expected value of the total number of learning patterns belonging to a predetermined class q is equivalent to or larger than a predetermined threshold value. Further, according to requirement (2), the predetermined feature pattern is one of the above-described feature patterns, where the entire expected values of the total number of learning patterns belonging to the other classes are equivalent to or smaller than another predetermined threshold value. Then, the feature pattern is determined to be a pattern representing the class q and recorded on the classification table 106, with a mark q. At this time, the don't-care sign is recorded on each of cells of from the j+1-th to n-th features (step S207).

Where no feature patterns that fulfill the requirements are obtained after the above-described search is made, an equation j=j+1 holds and the process returns to step S204. Then, the classification-table generation means 105 regenerates all possible combinations of from the first to j-th features ($c_1$, $c_2, \ldots c_j$). Where a search is run across the entire combinations up to the n-th feature and finished (j=n), the process is terminated.

Next, procedures for another pattern judgment according to the embodiment will be described with reference to FIG. 5 once again.

First, the feature extraction means 202 calculates feature vectors ($b_1, b_2, \ldots b_n$) according to Equations (6) by using the feature set stored in the feature storage means 104 for input patterns input from the pattern input means 201. Then, the feature extraction means 202 transmits the calculated feature vectors to the pattern judgment means 203. At this time, the classification-table generation means 105 determines the value of probability that the s-th feature $c_s$ (s=1 to n) becomes one to be probability b, and the value of a probability that the s-th feature $c_s$ becomes zero to be probability $(1-b_s)$.

The pattern judgment means 203 calculates the probability that the input pattern belongs to each of the classes with reference to the classification table 106. More specifically, this process has the following steps.

For example, where the probability that the input pattern belongs to class q=0 is calculated, first, the pattern judgment means 203 reads all feature patterns ($c_1, c_2, \ldots C_n$) for which marks q=0 are recorded from the classification table 106, Here, where a first pattern of the above-described feature patterns corresponds to an equation ($c_1, c_2, \ldots cn$)=(1, 0, *, *, \ldots, *) (where the symbol "*" indicates the don't-care sign). Since the value of a probability that the features $C_1$ and $C_2$ correspond to equations $c_1=1$ and $c_2=0$ for the input pattern is determined to be $b1 \cdot (1-b_2)$, the value of a probability that the feature vector of the input pattern matches the feature pattern is also determined to be $b1 \cdot (1-b_2)$. Since features of the third feature pattern and later are indicated by the don't-care sign, the values of the features of the third feature and later do not affect the entire probability.

As has been described, the pattern judgment means 203 calculates probabilities that the feature vector of an input pattern agrees with each feature pattern corresponding to equation q=0 by using the probabilities $b_s$ and $(1-b_s)$ calculated from the input pattern and obtains the total sum thereof. The total sum of the probabilities indicates the probability that the input pattern belongs to class q=0. The pattern judgment means 203 performs a comparison between the calculated probabilities that the input pattern belongs to each of the classes and outputs a class that provides a maximum probability, as a judgment result.

Further, the pattern may be compared to a predetermined threshold value and an instruction to reject (indicating that judgment is impossible) may be output according to the comparison result, as required.

Further, for reducing the processing time, only the classification table may be generated according to the method described in the embodiment and the pattern judgment process may be performed according to the method described in the first embodiment In this case, a feature vector corresponding to an input pattern is calculated according to Equations (2).

According to the above-described second embodiment of the present invention, the effective noises are added to the learning patterns. Therefore, a feature set with higher margins can be selected, Subsequently, the generalization ability (the ability to identify a pattern other than the learning patterns) of the second embodiment is higher than that of the first embodiment Next, a third embodiment of the present invention will be described with reference to the attached drawings. In this embodiment, the number of classes can be easily increased to at least three, as is the case with the above-described first and second embodiments. However, the number of classes is determined to be two (q=0 or 1) for the sake of description.

Figure 7:
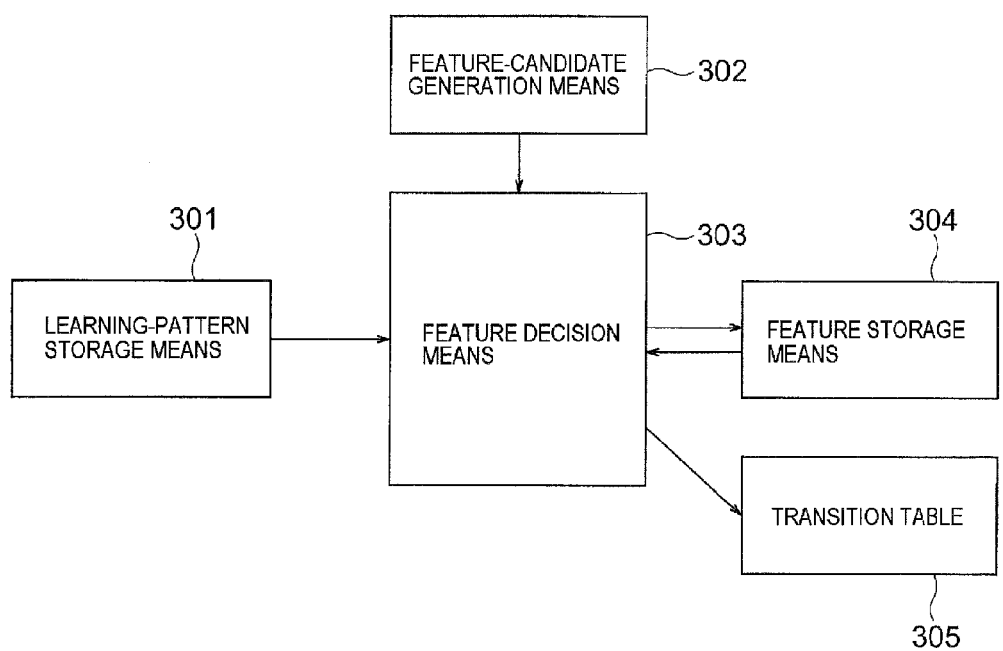
FIG. 7 is a block diagram illustrating the configuration of a system for performing a feature selection method according to a third embodiment of the present invention.

FIG. 7 is a block diagram illustrating a system configuration of the feature selection method according to the third embodiment of the present invention. Referring to this drawing, learning-pattern storage means 301 feature-candidate generation means 302, feature decision means 303, feature storage means 304, and a transition table 305 are shown. The description of the same parts as those of the above-described embodiments will be omitted.

The feature decision means 303 is provided for deciding a feature set suitable for identifying a pattern from among feature candidates generated by the feature-candidate generation means. The feature decision means 303 generates the transition table 305 recording parameters obtained during feature-decision procedures of this embodiment.

The transition table 305 is a table recording parameters used for performing a pattern-judgment process that will be described later.

Next, a description of the parameters or the like will be presented before describing the procedures.

The number of provided learning patterns is determined to be M. Further, L sets $D_i$ (i=1 to L) and a plurality of sets $D'_i$ (i=1 to L) that pair off therewith are provided. Here, the sign L indicates a predetermined natural number and an equation L=64 is adopted according to this embodiment.

Next, procedures for the feature selection method of the embodiment will be described with reference to the attached drawings. Procedures for determining the first feature are entirely the same as those of the above-described second embodiment.

Figure 8:
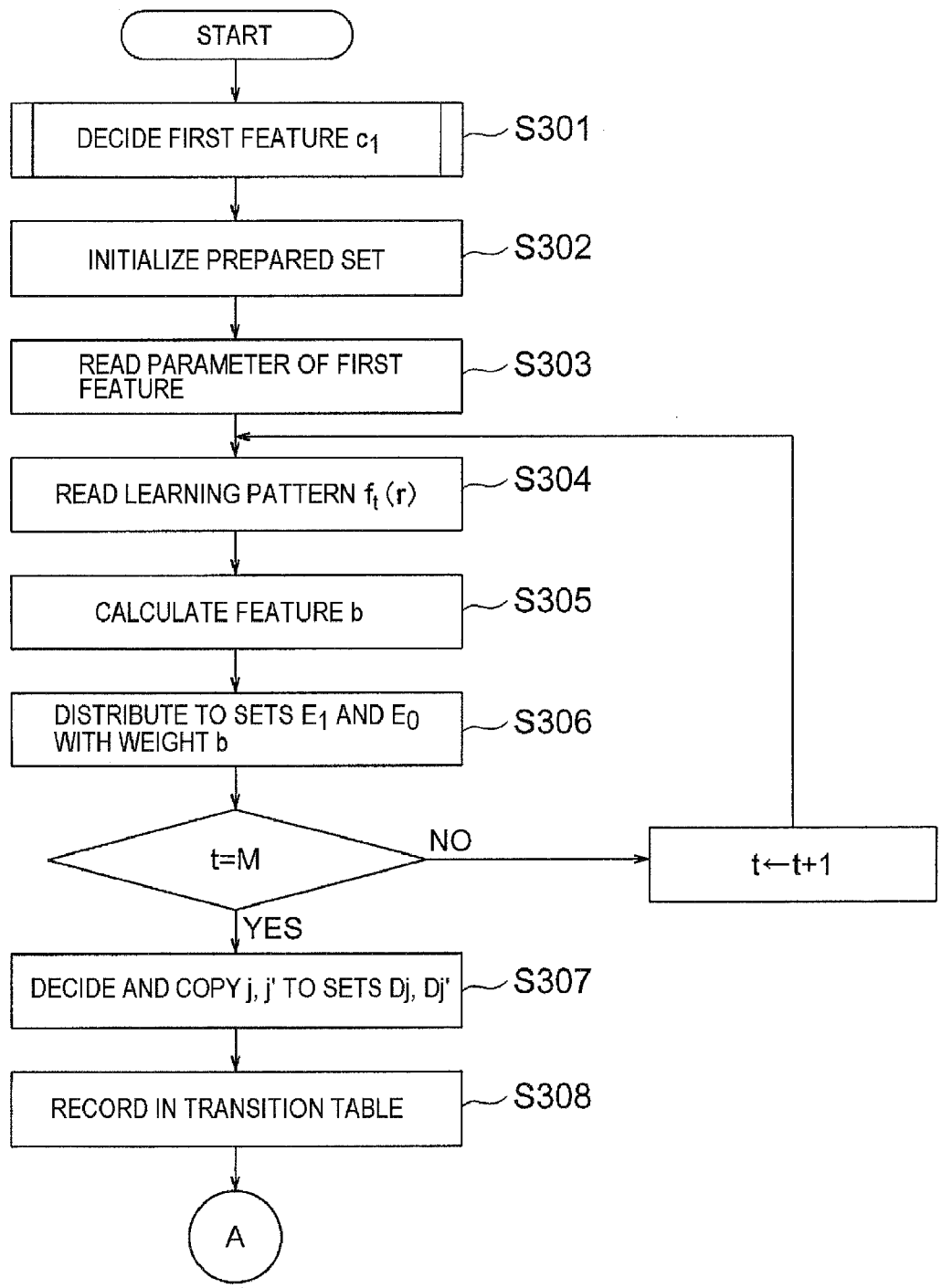
FIG. 8 is a flowchart illustrating the feature selection method according to the third embodiment of the present invention.
Figure 9:
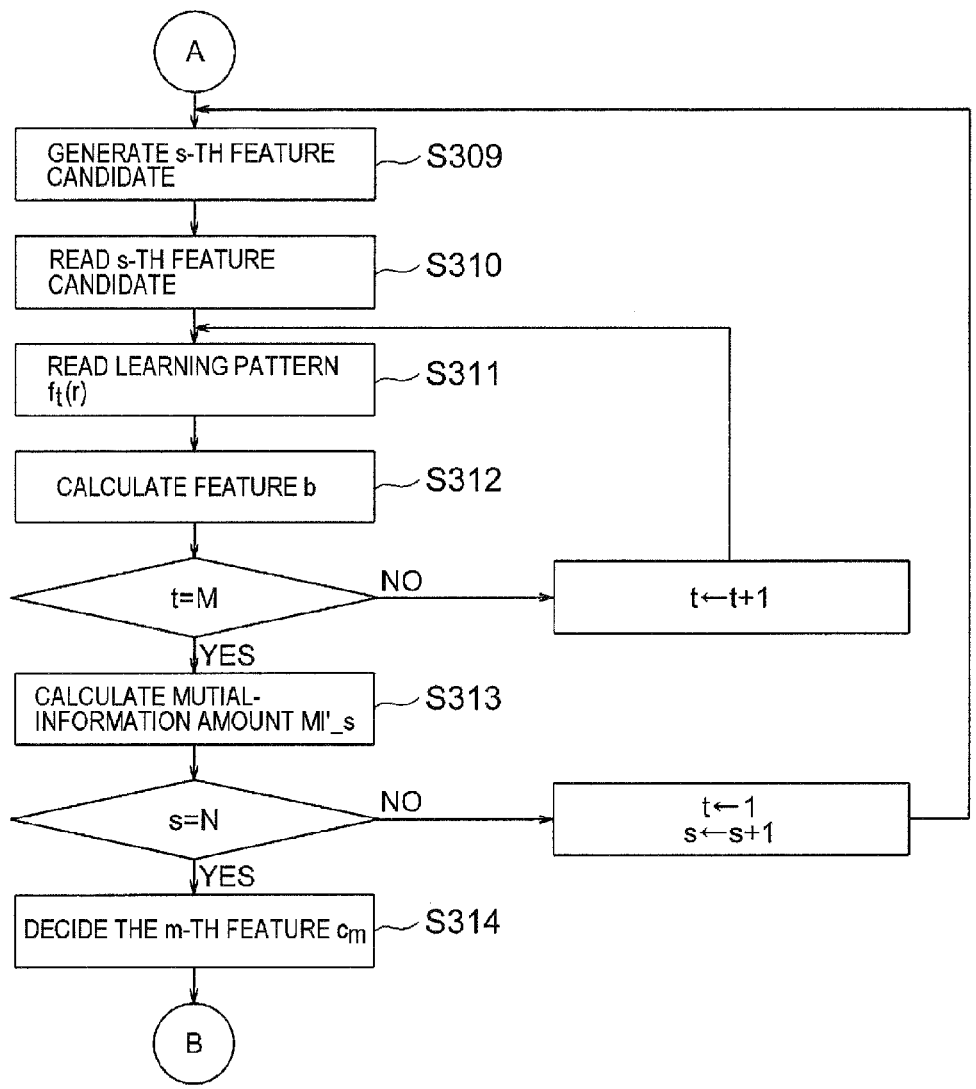
FIG. 9 is another flowchart illustrating the feature selection method according to the third embodiment of the present invention.
Figure 10:
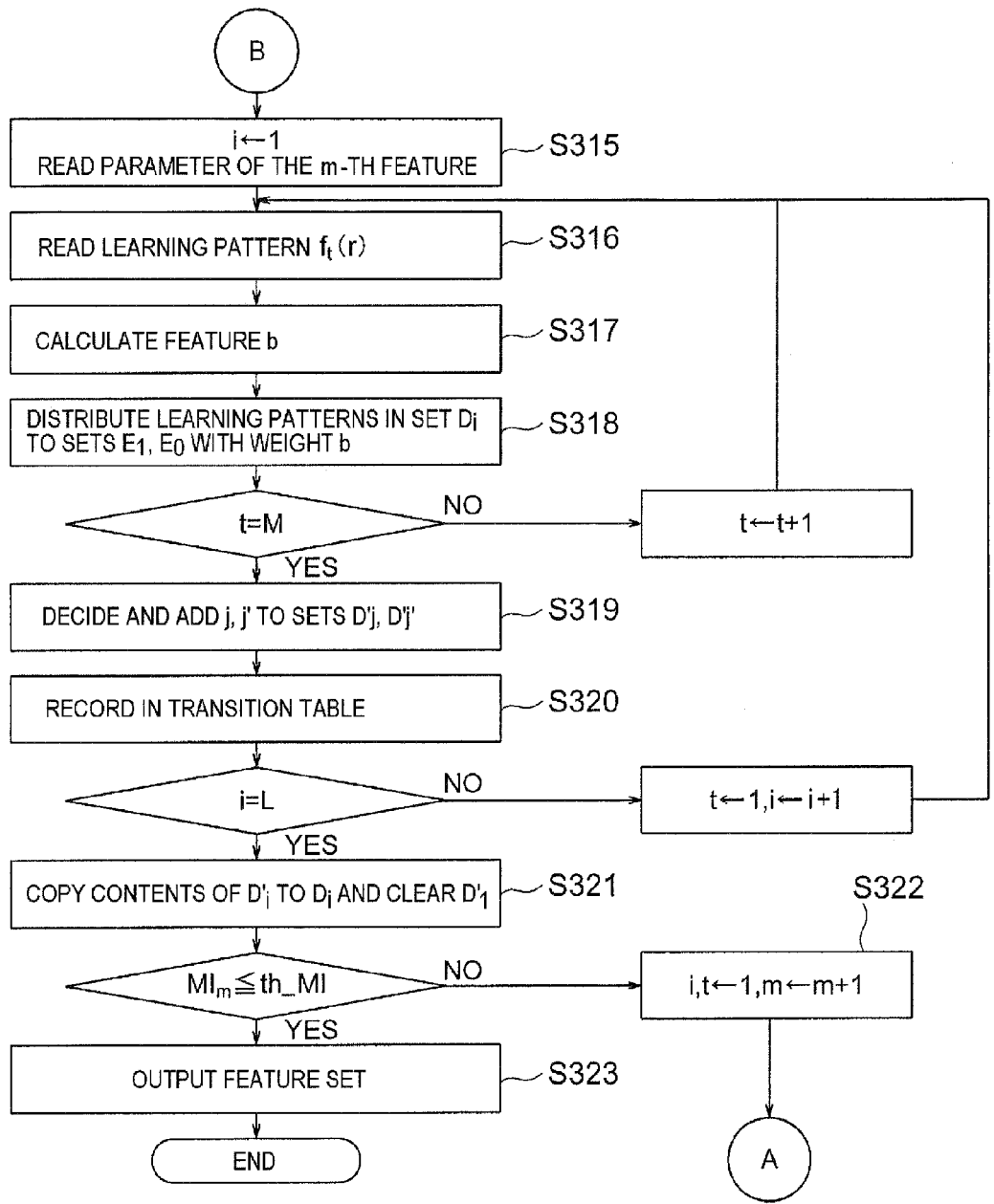
FIG. 10 is another flowchart illustrating the feature selection method according to the third embodiment of the present invention.

FIGS. 8, 9, and 10 show flowcharts illustrating the flow of processing for the feature selection method of the present invention. Referring to FIG. 8, where the first feature is determined (step S301), the feature decision means 303 initializes each of the sets $D_i$ and $D'_i$ (each i is equivalent to 1 to L) (step S302). Since an equation L=64 holds, sets $D_1$ to $D_{64}$ and sets $D'_1$ to $D'_{64}$ are initialized (cleared, so as to be null sets).

Regarding a feature-order parameter m, an equation m=2 holds. Subsequently, the procedures are started from a second feature.

Then, the feature decision means 303 calculates the feature b for each of the learning patterns according Equations (6) by using the determined first-feature parameter (steps S303 to S305).

Next, the feature decision means 303 distributes the learning patterns into set $E_1$, where the weight value is determined to be b. Further, the feature decision means 303 distributes the learning patterns into set $E_0$, where the weight value is determined to be (1−b) (step S306).

Next, the feature decision means 303 calculates $P(q=1|E_1)$ and $P(q=1|E_0)$ according to the following equations.

$$\left. \begin{array}{l} P(q=1|E_1) = M(q=1, E_1)/M(E_1) \\ P(q-1|E_0) = M(q=1, E_0)/M(E_0) \end{array} \right\} \quad (7)$$

Further, $M(E_0)$ indicates the total of weights of learning patterns belonging to set $E_0$ and $M(E_1)$ indicates the total of weights of learning patterns belonging to set $E_1$. $M(q=1|E_0)$ indicates the total of weights of learning patterns belonging to class q=1 and set $E_0$. Further, $M(q=1|E_1)$ indicates the total of weights of learning patterns belonging to class q1 and set $E_1$.

Next, the feature decision means 303 copies the details of the distributed sets $E_0$ and $E_1$ to sets $D_j$ and $D_{j'}$ determined from among a predetermined plurality of sets ($D_i$), respectively (step S307).

$$\left. \begin{aligned} d\_(j-1) < P(q=1|E_0) \le d\_j \\ d\_(j'-1) < P(q=1|E_1) \le d\_j' \end{aligned} \right\} \quad (8)$$

Here, d_j is a predetermined constant shown in the following equations (j=1 to L−1). According to the following equations, the value of constant d_j is between or equal to zero and one and increases, so as to resemble a letter S in shape according to the value of j. For example, where an equation $P(q=1|E_0)=0.15$ holds, an equation j=30 satisfying the upper equation of Equations (8) is determined according to equations d_29=0.111 . . . , d_30=0.2, and $E_0$ is copied to $D_{30}$. Similarly, where an equation $P(q=1|E_1)=0.7$ holds, an equation j'=34 satisfying the lower equation of Equations (8) is determined according to equations d_33=0.666 . . . , d_34=0.8, and $E_1$ is copied to $D_{34}$.

$$0=d\_0<d\_1<d\_2<\ldots<d\_L=1$$

$$d\_j = 2^{j-32}/(1+2^{j-32})$$

Of course, the above-described equations are determined so that they correspond to the number of sets $D_i$ and $D'_i$ and easily handled in this embodiment. Therefore, the equations are not limited to the above-described embodiment.

Here, the feature decision means 303 records (1, j, j') on the transition table 305 (step S307). For example, where equations j=30 and j=34 hold, (1 30, 34) is recorded on the transition table (see FIG. 11), so as to be used for pattern judgment that will be performed later. Where the first feature is represented by an equation $c_1=1$, the first feature is caused to transition to the set $D_j$, and where the first feature is represented by an equation $c_1=0$, the first feature is caused to transition to the set $D_{j'}$.

Next, referring to FIG. 9, first, the feature decision means 303 calculates the feature b for each learning pattern according to Equations (6) by using the s-th (where s=1 to N and s starts from one) (steps S309 to S312). At this time, as in the above-described second embodiment, the value of a feature c is determined to be one with probability b and determined to be zero with probability (1−b).

Next, the feature decision means 303 calculates information amount MI' obtained from the s-th feature candidate according to the following equations (step S313).

$$MI' = H_1 - \langle H_2 \rangle_c \quad (9)$$

where $$H_1 = -\sum_{q,i} P(q|D_i)\log P(q|D_i),$$

$$P(q|D_i) = M(q, D_i)/M(D_i)$$

$$H_2 = -\sum_{q,i} P(q|c, D_i)\log P(q|c, D_i),$$

$$P(q|c, D_i) = M(q, c, D_i)/M(c, D_i)$$

Here, $M(D_i)$ indicates the sum of weights of learning patterns in the set $D_i$ and $M(q, D_i)$ is the sum of weights of learning patterns that are in the set $D_i$ and that belong to class q. However, the sum relating to i is calculated only when the value of $M(D_i)$ is other than zero. Further, $M(c, D_i)$ is an expected value of the sum of weights of learning patterns that have features represented by c and that are in the set $D_i$. $M(q, c, D_i)$ is an expected value of the sum of weights of learning patterns that have features represented by c and are in the set $D_i$, and that belong to class q.

In the above-described manner, the feature b is calculated for each learning pattern until an equation s=N holds. Where the information amount MI' is calculated for the entire feature candidates, the feature decision means 303 performs a comparison therebetween and determines a feature candidate having a largest information amount to be the m-th feature of a feature set to be determined (step S314).

After the m-th feature having the largest information amount is determined in the above-described manner, the feature decision means 303 performs the following operation for the entire sets $D_i$ ($D_1$ to $D_{64}$).

Figure 13:
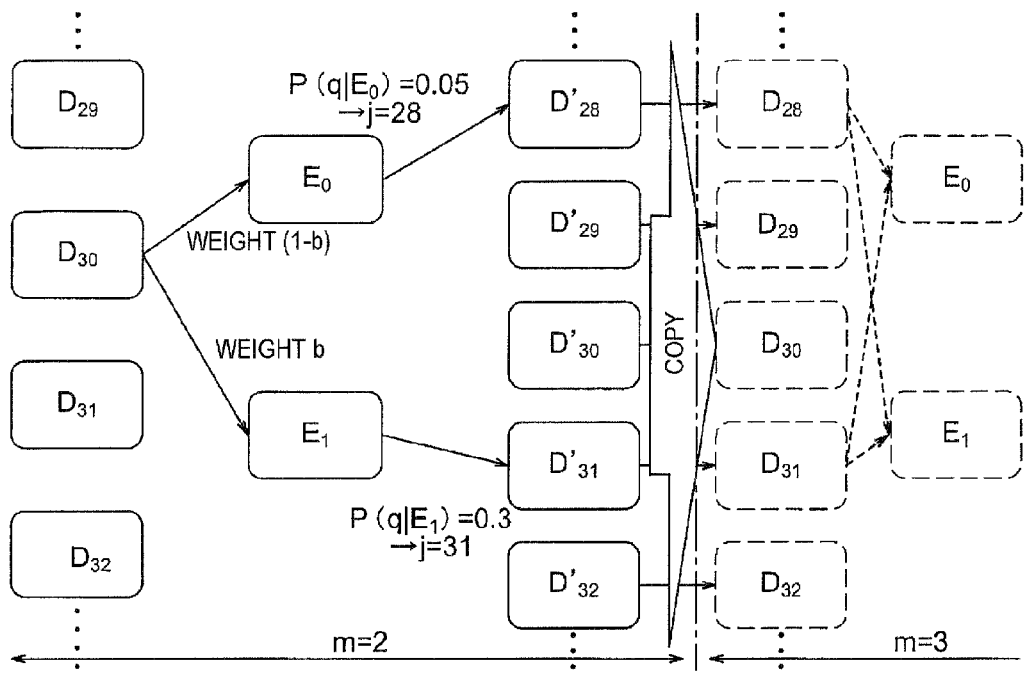
FIG. 13 schematically shows transitions between sets according to the third embodiment of the present invention.

Referring to FIG. 10, the feature decision means 303 calculates the feature b for each learning pattern according to Equations (6) by using the determined m-th feature parameter and distributes each of learning patterns belonging to the set $D_i$ to the sets $E_1$ and $E_0$ in a weight b:(1−b) ratio (steps S315 to S318, see FIG. 13).

Next, the feature decision means 303 calculates $P(q=1|E_1)$ and $P(q=1|E_0)$ according to Equations (7).

Subsequently, the feature decision means 303 adds the contents of the sets $E_0$ and $E_1$ after the distribution from the plurality of sets ($D'_i$) that had been prepared to the sets $D'_j$ and $D'_{j1}$ that are determined according to Equations (8), respectively (step S319). For example, where an equation $P(q=1|E_0)=0.05$ holds, as shown in FIG. 13, an equation j=28 satisfying the upper equation of Equations (8) is determined and $E_0$ is added to the set $D'_{28}$. Similarly, where an equation $P(q=1|E_1)=0.3$ holds, an equation j'=31 satisfying the lower equation of Equations (8) is determined and $E_1$ is added to the set $D'_{31}$ (see FIG. 13).

Here, the feature decision means 303 records (m, ij, j') on the transition table 305 (step S320). For example, where equations m=2, i=30, j=28, and j'=31 hold, (j=28 and j'=31) are recorded at positions (m=2 and i=30) corresponding thereto. The details of recorded data indicates that the m-th feature is caused to transition to the set $D_j$, where the value of m-th feature is represented by an equation $c_m=1$, and that the m-th feature is caused to transition to the set $D_{j'}$ where the value of m-th feature is represented by an equation $c_m=0$. The details of recorded data are used for performing pattern judgment that will be described later.

Where the above-described operations are finished for the entire sets $D_i$ (i=1 to L), the feature decision means 303 copies the set $D'_i$ (i=1 to L) to the set $D_i$ (i=1 to L) and initializes (clears) the set $D'_i$ (i=1 to L) for determining a subsequent feature, that is, the m+1-st feature (step S321, see FIG. 13).

The above-described procedures are repeated until the amount of information (the amount of added information) obtained at step S314 becomes smaller than a threshold value MI_th that had been set, even though a new feature is selected. Therefore, unless the above-described discontinue requirements are fulfilled, the feature decision means 303 returns to step S309 for determining the next m+1-st feature (step S322), where an equation m=m+1 holds.

On the other hand, where the discontinue requirements are fulfilled, the parameters of the determined feature set are stored in the feature storage means 304 (step S323).

Figures 11, 12:
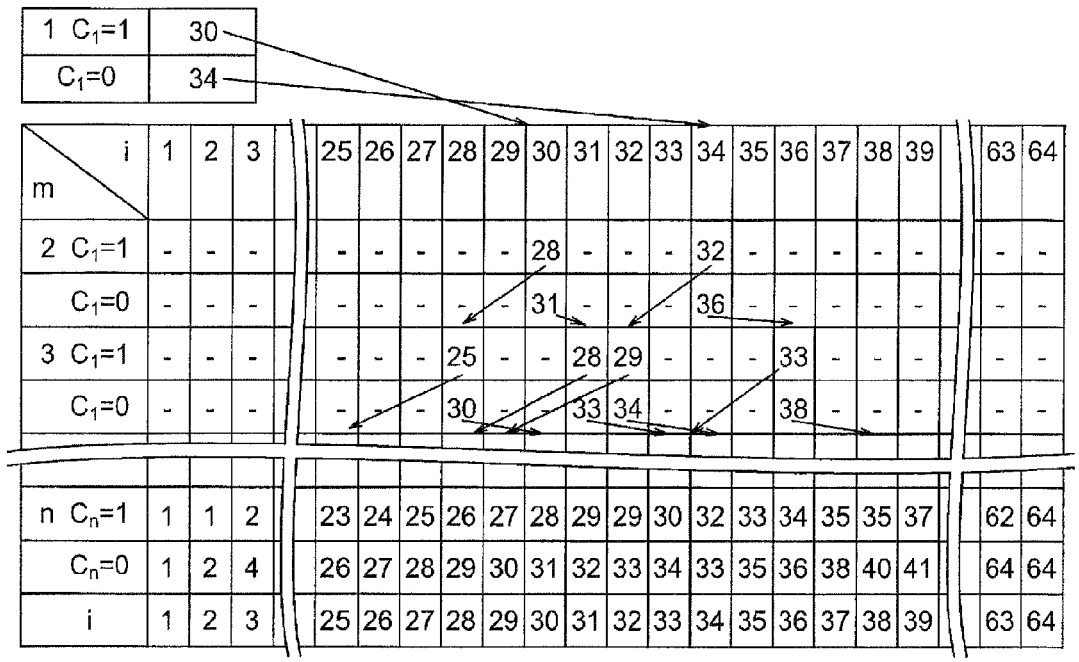
FIG. 11 is an example transition table generated according to the present invention.
FIG. 12 is another example transition table generated according to the present invention.

Here, a transition table according to the third embodiment of the present invention will be described, where the transition table is generated for performing a judgment process. FIG. 11 shows an example transition table. Referring to this drawing, the transition table includes a first part illustrating sets of transition destinations for the first feature. The transition table further includes a second part that illustrates transition destinations for the second feature and later. The second part is indicated by feature-order parameters m, set-number parameters i, and feature values Cm.

Further, referring to the first part of the transition table shown in this drawing, "30" is written in a cell corresponding to equation $c_1=1$ and "34" is written in a cell corresponding to equation $c_1=0$, which indicates that "where the first feature is represented by equation $c_1=1$, the first feature is caused to transition to the set $D_{30}$ and where the first feature is represented by equation $c_1=0$, the first feature is caused to transition to the set $D_{34}$". Further, referring to cells corresponding to equations m=2 and i=30 of the second part of the transition table shown in this drawing, "28" is written in a cell corresponding to equation $c_1=1$ and "31" is written in a cell corresponding to equation $c_1=0$, which indicates that "where the second feature is represented by equation $c_2=1$, a pattern belonging to the set $D_{30}$ is caused to transition to the set $D_{28}$ and where the second feature is represented by equation $c_2=0$, the pattern is caused to transition to the set $D_{31}$".

Each of signs "–" shown in cells of the second part of this drawing indicates that the cells are blank. For example, in a row (m=2) showing transition destinations based on the value of the second feature $c_2$, each of cells other than cells on columns corresponding to the sets $D_{30}$ and $D_{24}$ (i=30, 34) is the black cell "_". This configuration corresponds to the fact that sets of transition destinations corresponding the first feature is represented by "30" or "34". That is to say, according to the transition table shown in FIG. 11, an input pattern is caused to transition to the set $D_{30}$ or the set $D_{34}$ according to the first feature, which eliminates the need for referring to other cells.

Further, according to the transition table shown in FIG. 11, the part illustrating the sets of transition destinations for the first feature and the part illustrating the sets of transition destinations for the second feature and later are separately shown. However, the configuration is not limited to the above-described embodiment, so long as the sets of transition destinations are illustrated by the feature-order parameters m, set-number parameters i, and feature values Cm. For example, the first and second parts shown in this drawing may be combined with each other, as shown in FIG. 12.

Figure 14:
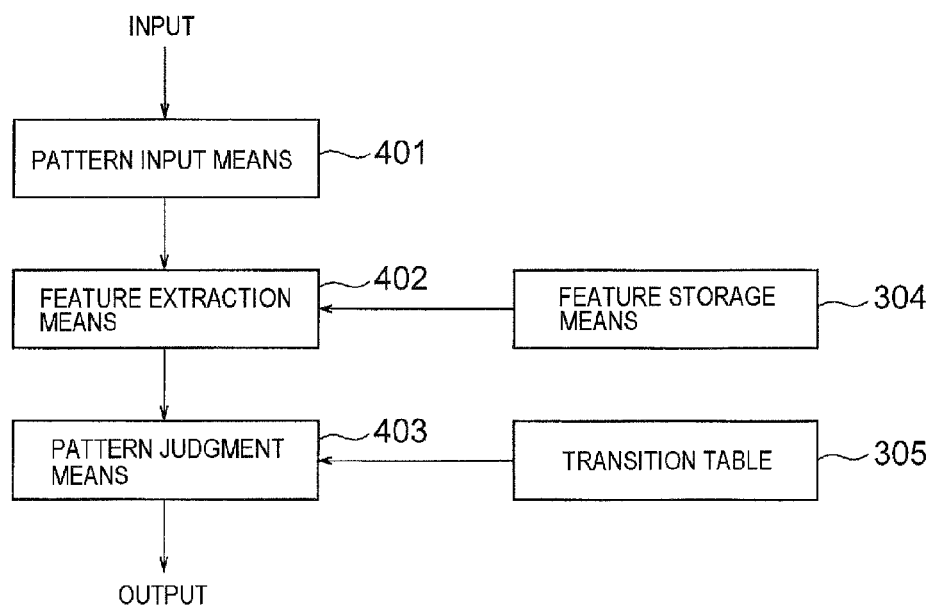
FIG. 14 is a block diagram illustrating the configuration of a system for performing a pattern judgment method according to the third embodiment of the present invention.

Next, procedures for performing pattern judgment in this embodiment will now be described with reference to the attached drawing. FIG. 14 is a block diagram showing a pattern judgment method used for judging a pattern by using the above-described feature sets. Referring to this drawing, pattern input means 401, feature extraction means 402, and pattern judgment means 403 are shown. Further, feature storage means 304 used by the feature extraction means 402, so as to extract a feature and a transition table 305 used by the pattern judgment means 403, so as to judge a pattern are shown.

The operation of the pattern judgment will now be described. First, the pattern input means 401 receives an input pattern from a predetermined medium and transmits the input pattern to the feature extraction means 402.

Next, the feature extraction means 402 calculates a feature vector $(b_1, b_2, \ldots b_n)$ for the input pattern according to Equations (6) by using the feature set (determined according to the above-described feature decision method) stored in the feature storage mean 304. Further, the feature extraction means 401 transmits the calculation result to the pattern judgment means 403.

At this time, the probability that the value of feature $c_s$ (s=1 to n) becomes one is determined to be probability $b_s$, and the probability that the value of feature $c_s$ becomes zero is determined to be probability $(1-b_s)$. The pattern judgment means 403 calculates the probability that the input pattern belongs to each of classes by referring to the transition table 305 in sequence.

First, the pattern judgment means 403 reads a transition rule (1, j, j') on the basis of the first feature, and causes the state to transition to state j with probability $b_1$. Further, the pattern judgment means 403 causes the state to transition to state j' with probability $(1-b_1)$. Then, the probability that the value of the second feature $c_2$ becomes one is determined to be probability $b_2$ and the probability that the value of the second feature $c_2$ becomes zero is determined to be probability $(1-b_2)$. Then, the pattern judgment means 403 reads a transition rule on the basis of the second feature and further causes the state to transition to another. For example, where (2, j, k, k') and (2, J', k", k'") are written in the transition rule on the basis of the second feature, state j is caused to transition to state k with probability $b_2$ and state k' with probability $(1-b_2)$. Further, state j' is caused to transition to state k" with probability $b_2$ and state k'" with probability $(1-b_2)$. In this case, therefore, the value of probability of remaining in state k is determined to be $b_1 \cdot b_2$, the value of probability of remaining in state k' is determined to be $b_1 \cdot (1-b_2)$, the value of probability of remaining in state k" is determined to be $(1-b_1) \cdot b_2$, and the value of probability of remaining in state k'" is determined to be $(1-b_1) \cdot (1-b_2)$, respectively. In this manner, the pattern judgment means 403 causes the state to transition with reference to the transition table by using features up to the n-th feature.

Where the state is caused to transition by using features up to the n-th feature in the above-described manner, the value of probability of remaining in each of states j is calculated, as P(j)(j=1 to L). At this time, probability p (q=1) that the input pattern belongs to class q=1 can be obtained according to the following equations.

$$P(q = 1) = \sum_{j=1,L} P(j)P(q = 1 \mid j) \tag{10}$$

where $$P(q = 1 \mid j) = (d\_j + d\_(j-1))/2 \tag{11}$$

Where the above-described probability P(q=1) is larger than a predetermined threshold value, the pattern judgment means 403 determines that "the input pattern belongs to class q=1" and outputs the determination result. Further, where the probability P(q=1) is smaller than the predetermined threshold value, the pattern judgment means 403 rejects the probability, or determined that judgment cannot be performed and outputs the determination result. Of course, this configuration can be modified in various ways. For example, two values including an adoption critical value and a rejection critical value may be provided, as the threshold value. Further, it may be determined that the pattern judgment cannot be performed where the probability value is within boundaries.

Further, according to this embodiment, the value of P(q=1|j) is determined according to Equation (11). However, the value can be determined in the following manner by using learning patterns. That is to say, learning patterns $f_i(r)$ (i=1 to M) are caused to transition according to the transition table and probability P(i, j) that each of the learning patterns stays in state j in the end is calculated based on feature vectors ($b_1$, $b_2, \ldots b_n$) of the learning patterns. Next, the sum of values of P(i, j) for only learning patterns belonging to class q=1 is determined to be P1(j) and the sum of values of P(i, j) of the entire learning patterns is determined to be Ptotal(j). Then, the value of P(q=1|j) is determined based on equation P(q=1|j)= P1(j)/Ptotal(j).

As a modification for reducing the processing time required for performing the pattern judgment of this embodiment, the following method can be adopted. That is to say, only the transition table 305 is generated according to the method of this embodiment and the feature vectors for the input patterns are calculated according to Equations (2). In this case, the pattern judgment is performed in the following manner. That is to say, probabilistic operations are not performed during the judgment process and the state is caused to transition determinately according to the feature vectors obtained by Equations (2). Further, in this case, where the state is caused to transition according to the transition table, the state is caused to transition determinately in each stage. Therefore, where the state is caused to transition by using features up to the n-th feature, the state is finally fixed to a predetermined state of from 1 to L, that is, state j. Then, the value of P(q=1|j) shown in Equation (11) corresponding to the above-described state j is examined. Where the value is larger than a predetermined threshold value, it is determined that "the input belongs to class q=1" and the determination result is output.

In the above-described third embodiment of the present invention, noises are effectively added to learning patterns, as is the case with the second embodiment. Therefore, a feature set with a higher margin can be selected.

Further, according to the third embodiment of the present invention, the calculations performed for selecting features can be significantly reduced compared to those of the second embodiment. This because the calculations for selecting features can be achieved by calculating the amount of information obtained where a predetermined number of sets is divided according to the features thereof (equations (9)) even though the number n of selected features increases, where the number of sets is determined to be L, at most.

Further, according to the third embodiment of the present invention, the information amount is calculated by merging once-separated learning patterns into the set $D_i$, as required. Therefore, the number of learning patterns belonging to each set $D_i$ is prevented from being decreased significantly. As a result, the occurrence of a phenomenon where the features are selected according to the learning patterns is reduced and the generalization ability further increases.

As has been described, according to the present invention, highly sophisticated pattern identification can be performed without requiring enormous learning. This is because the present invention provides a method for uniquely selecting features later than a predetermined feature without depending on the value of the predetermined feature.

Further, according to the present invention, the identification ability (generalization ability) significantly increases. This is because the present invention provides a configuration for significantly simplifying the structure of a classifier.

INDUSTRIAL APPLICABILITY

The present invention is suitable for selecting, classifying, and judging the features of patterns used for image identification or the like.

The invention claimed is:

1. A feature selection method used for a system including learning-pattern storage for storing and maintaining a learning pattern including class information, feature-candidate generation for generating a plurality of feature candidates, and feature decision for deciding a feature set suitable for pattern identification from among the plurality of feature candidates generated by the feature-candidate generation, wherein the feature decision, utilizing a computer-readable memory, prepares a predetermined number of sets for causing the learning patterns to transition according to feature values, decides a predetermined feature candidate having a largest amount of mutual information from the class information of the learning patterns, as a first feature of the feature set by calculating the feature value of each of the learning patterns corresponding to the feature candidates, adds weights to each of the learning patterns according to the decided feature, distributes the learning patterns, and causes the learning patterns to transition to a set corresponding to the determined feature in sequence, and decides predetermined feature candidates having a next largest amount of mutual information between the feature value of the learning pattern corresponding to the feature candidate and the class information of the learning pattern in sequence, as next features of the feature set, under the condition that information about the set including the learning patterns and the decided feature are known.

2. The feature selection method according to claim 1, wherein the feature candidates generated by the feature-candidate generation include one of the feature candidates using a complex Gabor function, as a feature extraction function.

3. The feature selection method according to claim 1, wherein the feature candidates generated by the feature-candidate generation includes a feature candidate obtained from a feature extraction function obtained by normalizing a complex Gabor function.

4. The feature selection method according to claim 1, wherein the feature decision calculates a probability that a feature of each of the learning patterns has a predetermined value, as the feature value of each of the learning patterns corresponding to the feature candidates.

5. A method for classifying patterns used for a system including learning-pattern storage for storing and maintaining the learning patterns used for learning, feature-candidate generation for generating a plurality of feature candidates, feature decision for deciding a feature set suitable for pattern identification from among the plurality of feature candidates generated by the feature-candidate generation, feature storage for storing and maintaining the feature set decided by the feature decision, and classification-table generation for generating a classification table, wherein the classification-table generation calculates the feature value of each of the learning patterns by using the feature set decided according to the feature selection method in claim 1, and classifies the learning patterns according to the classification table including the feature values of the learning patterns and class information.

6. The method for classifying learning patterns according to claim 5,
wherein where the learning patterns can be classified irrespective of the feature values, the classification-table generation
provides a redundant item in place of the feature value in the classification table at a position corresponding thereto.

7. The method for pattern judgment used for the system including pattern input for inputting patterns, a feature extraction for extracting features from the patterns, pattern judgment for judging the patterns based on the features, and feature storage for storing and maintaining the decided feature set,
wherein the feature extraction
calculates the feature value of each of the input patterns by using the feature set decided by the feature selection method according to claim 1, and
performs the pattern judgment based on the calculated feature values.

8. The method for pattern judgment according to claim 7 wherein the pattern judgment performs the pattern judgment by using the classification table obtained by a method for classifying patterns of storing and maintaining the learning patterns used for learning, feature-candidate generation for generating a plurality of feature candidates, feature decision for deciding a feature set suitable for pattern identification from among the plurality of feature candidates generated by the feature-candidate generation, feature storage for storing and maintaining the feature set decided by the feature decision.

9. The method for pattern judgment according to claim 8,
wherein each of the feature values of the input patterns indicates a value of a probability that a feature of a concerned rank becomes a predetermined value,
wherein the pattern judgment
performs judgment by calculating a probability that each feature pattern included in the classification table becomes a value of a predetermined class information by using the feature values.

10. A method for pattern judgment used for a system including pattern input for inputting patterns, feature extraction for extracting features from the patterns, pattern judgment for judging the patterns based on the features, and feature storage for storing and maintaining a decided feature set,
wherein the feature extraction
calculates a feature value of each of the input patterns by using the feature set decided according to the feature selection method according to claim 1,
wherein the pattern judgment
causes the input patterns to transition based on
the feature values of the input patterns and
a transition table that stores sets to which the learning patterns belong at the time where each feature of the feature set obtained by the feature selection method according to claim 1 is decided in sequence, and
wherein the pattern judgment is performed based on the sets to which the input patterns belong, as a result of a transition.

11. A method for pattern judgment used for a system including pattern input for inputting patterns, feature extraction for extracting features from the patterns, pattern judgment for judging the patterns based on the features, and feature storage for storing and maintaining a decided feature set,
wherein the feature extraction
calculates a feature probability for each of the input patterns, the feature probability indicating a probability that the feature of a concerned rank becomes a predetermined value by using the feature set determined by the feature selection method according to claim 1,
wherein the pattern judgment
causes the input patterns to transition based on
the feature probabilities of the input patterns and
a transition table that stores sets to which learning patterns belong at the time where each feature is decided in sequence according to the feature selection method according to claim 1, and
performs the pattern judgment by calculating a probability that each of the input patterns has predetermined class information based on a route of the transition.

12. A program on a computer readable medium run by a computer forming a system including learning-pattern storage for storing on a computer-readable medium and maintaining a learning pattern including class information, feature-candidate generation for generating a plurality of feature candidates, and feature decision for deciding a set of features suitable for pattern identification from among the plurality of feature candidates generated by the feature-candidate generation,
wherein the program performs feature selection by making the computer perform the steps of
deciding a predetermined feature candidate having a largest amount of mutual information from the class information of the set of the learning patterns, as a first feature of the feature set, by calculating a feature value of each of the learning patterns corresponding to the feature candidates;
deciding predetermined feature candidates having a largest amount of mutual information between the feature value of the learning pattern corresponding to the feature candidate and the class information of the learning pattern in sequence, as next features of the feature set, under the condition that the decided features are known; and
wherein the computer calculates a probability that a feature of each of the learning patterns has a predetermined value, as the feature value of each of the learning patterns corresponding to the feature candidates.

13. A program on a computer-readable medium run by a computer forming a system including learning-pattern storage for storing and maintaining a learning pattern including class information, feature-candidate generation for generating a plurality of feature candidates, and feature decision for deciding a feature set suitable for pattern identification from among the plurality of feature candidates generated by the feature-candidate generation,
wherein the program performs feature selection by making the computer perform the steps of:
preparing a predetermined number of sets for causing the learning patterns to transition according to a plurality of feature values;
deciding a predetermined feature candidate having a largest amount of mutual information from class information of the set of the learning patterns, as a first feature of the feature set, by calculating the feature value of each of the learning patterns corresponding to the feature candidates,
adding a weight to each of the learning patterns according to the decided feature, distributing the learning patterns, and causing the learning patterns to transition to a set corresponding to the decided feature in sequence, and
deciding predetermined feature candidates having a largest amount of mutual information between the feature value of the learning pattern corresponding to the feature candidate and the class information of the learning pattern in sequence, as next features of the feature set, under the condition that information about the set including the learning patterns and the decided features are known.

14. The program according to claim 12,
wherein the feature candidates include a feature candidate using a complex Gabor function, as a feature extraction function.

15. The program according to claim 12,
wherein the feature candidates generated by the feature-candidate generation include a feature candidate obtained from a feature extraction function obtained by normalizing a complex Gabor function.

16. The program according to claim 12,
wherein the program further makes the computer perform an operation for each of the learning patterns by using a noise parameter determined for each of the feature candidates.

17. A program run by a computer forming a system including learning-pattern storage for storing and maintaining learning patterns used for learning, feature-candidate generation for generating a plurality of feature candidates, feature decision for deciding a set of features suitable for pattern identification from among the plurality of feature candidates generated by the feature-candidate generation, feature storage for storing and maintaining the feature set decided by the feature decision, and classification-table generation for generating a classification table,
wherein the program performs learning-pattern classification by making the computer perform the steps of:
calculating a feature of each of the learning patterns by using the feature set decided by running the program according to claim 12; and
classifying the learning patterns according to the classification table including the feature values of the learning patterns and class information.

18. The program according to claim 17,
wherein where the learning patterns can be classified irrespective of the feature values,
a redundant item is provided in place of the feature value in the classification table at a position corresponding thereto.

19. A program run by a computer forming a system including pattern input for inputting patterns, feature extraction for extracting features from the patterns, pattern judgment for judging the patterns based on the features, and feature storage for storing and maintaining a decided feature set
wherein the program makes the computer perform a step of calculating the feature value of each of the input patterns by using the feature set decided by running the program according to claim 12,
whereby pattern judgment is performed based on the performance result.

20. The program according to claim 19 wherein the computer performs the pattern judgment by using the classification table obtained by storing and maintaining learning patterns used for learning, feature-candidate generation for generating a plurality of feature candidates, feature decision for deciding a set of features suitable for pattern identification from among the plurality of feature candidates generated by the feature-candidate generation, feature storage for storing and maintaining the feature set decided by the feature decision.

21. The program according to claim 20,
wherein each of the feature values of the input patterns calculated by the computer indicates a value of a probability that a feature of a concerned rank becomes a predetermined value,
wherein the computer performs judgment by calculating a probability that each feature pattern included in the classification table becomes a value of predetermined class information
by using the feature values.

22. A program on a computer-readable medium run by a computer forming a system including pattern input for inputting patterns, feature extraction for extracting features from the patterns, pattern judgment for judging the patterns based on the features, and feature storage for storing and maintaining a decided feature set, wherein the program judges the input patterns based on a set to which the input patterns belong by making the computer perform the steps of:
calculating the feature value of each of the input patterns by using the feature set decided by running the program which performs feature selection by making the computer perform the steps of:
deciding a predetermined feature candidate having a largest amount of mutual information from the class information of the set of the learning patterns, as a first feature of the feature set, by calculating a feature value of each of the learning patterns corresponding to the feature candidates;
deciding predetermined feature candidates having a largest amount of mutual information between the feature value of the learning pattern corresponding to the feature candidate and the class information of the learning pattern in sequence, as next features of the feature set, under the condition that the decided features are known; and
wherein the computer calculates a probability that a feature of each of the learning patterns has a predetermined value, as the feature value of each of the learning patterns corresponding to the feature candidates; and
causing the input patterns to transition based on the feature values of the input patterns and a transition table that stores sets to which the learning patterns belong at the time where each feature is decided in sequence by running the program which performs feature selection by making the computer perform the steps of:
preparing a predetermined number of sets for causing the learning patterns to transition according to a plurality of feature values;
deciding a predetermined feature candidate having a lamest amount of mutual information from class information of the set of die learning patterns, as a first feature of the feature set, by calculating the feature value of each of the learning patterns corresponding to the feature candidates,
adding a weight to each of the learning patterns according to the decided feature, distributing the learning patterns, and causing the learning patterns to transition to a set corresponding to the decide feature in sequence, and
deciding predetermined feature candidates having a largest amount of mutual information between the feature value of the learning pattern corresponding to the feature candidate and the class information of the learning pattern in sequence, as next features of the feature set, under the condition that information about the set including the learning patterns and the decided features are known.

23. A program on a computer-readable medium run by a computer forming a system including pattern input for inputting patterns, feature extraction for extracting features from the patterns, pattern judgment for judging the patterns based on the features, and feature storage for storing and maintaining a decided feature set, wherein the program judges the input patterns based on a set to which the input patterns belong by making the computer perform the steps of:

wherein the program makes the computer perform the steps of:

calculating a feature probability for each of the input patterns, the feature probability indicating a probability that the feature of a concerned rank becomes a predetermined value by using the feature set decided by running the program which performs feature selection by making the computer perform the steps of:

deciding a predetermined feature candidate having a largest amount of mutual information from the class information of the set of the learning patterns, as a first feature of the feature set, by calculating a feature value of each of the learning patterns corresponding to the feature candidates;

deciding predetermined feature candidates having a largest amount of mutual information between the feature value of the learning pattern corresponding to the feature candidate and the class information of the Learning pattern in sequence, as next features of the feature set, under the condition that the decided features are known; and wherein the computer calculates a probability that a feature of each of the learning patterns has a predetermined value, as the feature value of each of the learning patterns corresponding to the feature candidates;

causing the input patterns to transition based on the feature probabilities of the input patterns and a transition table that stores sets to which learning patterns belong at the time where each feature is decided in sequence by running the program which performs feature selection by making the computer perform the steps of:

preparing a predetermined number of sets for causing the learning patterns to transition according to a plurality of feature values;

deciding a predetermined feature candidate having a largest amount of mutual information from class information of the set of the learning patterns, as a first feature of the feature set, by calculating the feature value of each of the learning patterns corresponding to the feature candidates, adding a weight to each of the learning patterns according to the decided feature, distributing the learning patterns, and causing the learning patterns to transition to a set corresponding to the decided feature in sequence, and deciding predetermined feature candidates having a largest amount of mutual information between the feature value of the learning pattern corresponding to the feature candidate and the class information of the learning pattern in sequence, as next features of the feature set, under the condition that information about die set including the learning patterns and the decided features are known; and calculating a probability that each of the input patterns has predetermined class information based on a route of the transition, whereby the input patterns are judged based on a result of the calculation.

24. A pattern learning system for maintaining the program according to claim 12 so that the programs can be run, so as to perform learning-pattern-feature selection.

25. A pattern classification system for maintaining the program according to claim 18 so that the programs can be run, so as to perform learning-pattern classification.

26. A pattern judgment system for maintaining the program according to claim 19 so that the programs can be run, so as to perform input-pattern judgment.

27. The feature selection method according to claim 1, wherein the feature candidates generated by the feature-candidate generation include a feature candidate using a complex Gabor function, as a feature extraction function.

28. The feature selection method according to claim 1, wherein the feature candidates generated by the feature-candidate generation includes a feature candidate obtained from a feature extraction function obtained by normalizing a complex Gabor function.

29. The feature selection method according to claim 1, wherein the feature decision
performs an operation for each of the learning patterns by using a noise parameter determined for each of the feature candidates.

30. The feature selection method according to claim 1, wherein the feature decision
calculates a probability that a feature of each of the learning patterns has a predetermined value, as the feature value of each of the learning patterns corresponding to the feature candidates.

31. A method for classifying patterns used for a system including learning-pattern storage for storing and maintaining the learning patterns used for learning, feature-candidate generation for generating a plurality of feature candidates, feature decision for deciding a feature set suitable for pattern identification from among the plurality of feature candidates generated by the feature-candidate generation, feature storage for storing and maintaining the feature set decided by the feature decision, and classification-table generation for generating a classification table,
wherein the classification-table generation
calculates the feature value of each of the learning patterns by using the feature set decided according to the feature selection method in claim 1, and
classifies the learning patterns according to the classification table including the feature values of the learning patterns and class information.

32. The method for classifying learning patterns according to claim 31,
wherein where the learning patterns can be classified irrespective of the feature values,
the classification-table generation
provides a redundant item in place of the feature value in the classification table at a position corresponding thereto.

33. A method for pattern judgment used for a system including pattern input for inputting patterns, feature extraction for extracting features from the patterns, pattern judgment for judging the patterns based on the features, and feature storage for storing and maintaining a decided feature set,
wherein the feature extraction
calculates the feature value of each of the input patterns by using the feature set decided by the feature selection method according to claim 1, and
performs the pattern judgment based on a result of the calculation.

34. The method for pattern judgment according to claim 33 wherein the pattern judgment performs the pattern judgment
performs the pattern judgment by using the classification table obtained by storing and maintaining the learning patterns used for learning, feature-candidate generation for generating a plurality of feature candidates, feature decision for deciding a feature set suitable for pattern identification from among the plurality of feature candidates generated by the feature-candidate generation, feature storage for storing and maintaining the feature set decided by the feature decision, wherein where the learning patterns can be classified irrespective of the feature values, the classification-table generation provides a redundant item in place of the feature value in the classification table at a position corresponding thereto.

35. The method for pattern judgment according to claim 34, wherein each of the feature values of the input patterns indicates a value of a probability that a feature of a concerned rank becomes a predetermined value, wherein the pattern judgment performs judgment by calculating a probability that each feature pattern included in the classification table becomes a value of a predetermined class information by using the feature values.

36. A method for pattern judgment used for a system including pattern input for inputting patterns, feature extraction for extracting features from the patterns, pattern judgment for judging the patterns based on the features, and feature storage for storing and maintaining a decided feature set, wherein the feature extraction calculates the feature value of each of the input patterns by using the feature set decided according to the feature selection method according to claim 1, wherein the pattern judgment causes the input patterns to transition based on the feature values of the input patterns and a transition table that stores sets to which the learning patterns belong at the time where each feature of the feature set obtained by the feature selection method according to claim 1 is decided in sequence, and wherein the pattern judgment is performed based on the sets to which the input patterns belong, as a result of the transition.

37. A method for pattern judgment used for a system including pattern input for inputting patterns, feature extraction for extracting features from the patterns, pattern judgment for judging the patterns based on the features, and feature storage for storing and maintaining a decided feature set, wherein the feature extraction calculates a feature probability for each of the input patterns, the feature probability indicating a probability that the feature of a concerned rank becomes a predetermined value by using the feature set determined by the feature selection method according to claim 1, wherein the pattern judgment causes the input patterns to transition based on the feature probabilities of the input patterns and a transition table that stores sets to which learning patterns belong at the time where each feature is decided in sequence according to the feature selection method according to claim 1, and performs the pattern judgment by calculating a probability that each of the input patterns has predetermined class information based on a route of the transition.

38. The program according to claim 13, wherein the feature candidates include a feature candidate using a complex Gabor function, as a feature extraction function.

39. The program according to claim 13, wherein the feature candidates generated by the feature-candidate generation include a feature candidate obtained from a feature extraction function obtained by normalizing a complex Gabor function.

40. The program according to claim 13, wherein the program further makes the computer perform an operation for each of the learning patterns by using a noise parameter determined for each of the feature candidates.

41. The program according to claim 13, wherein the computer calculates a probability that a feature of each of the learning patterns has a predetermined value, as the feature value of each of the learning patterns corresponding to the feature candidates.

42. A program run by a computer forming a system including learning-pattern storage for storing and maintaining learning patterns used for learning, feature-candidate generation for generating a plurality of feature candidates, feature decision for deciding a set of features suitable for pattern identification from among the plurality of feature candidates generated by the feature-candidate generation, feature storage for storing and maintaining the feature set decided by the feature decision, and classification-table generation for generating a classification table, wherein the program performs learning-pattern classification by making the computer perform the steps of:

calculating a feature of each of the learning patterns by using the feature set decided by running the program according to claim 13; and classifying the learning patterns according to the classification table including the feature values of the learning patterns and class information.

43. The program according to claim 42, wherein the learning patterns can be classified irrespective of the feature values, a redundant item is provided in place of the feature value in the classification table at a position corresponding thereto.

44. A program run by a computer forming a system including pattern input for inputting patterns, feature extraction for extracting features from the patterns, pattern judgment for judging the patterns based or the features, and feature storage for storing and maintaining a decided feature set wherein the program makes the computer perform a step of calculating the feature value of each of the input patterns by using the feature set decided by running the program according to claim 13, whereby pattern judgment is performed based on the performance result.

45. The program according to claim 44 wherein the computer performs the pattern judgment by using a classification table obtained by running the program which performs learning-pattern classification by making the computer perform the steps of:

calculating a feature of each of the learning patterns by using the feature set decided by running the program;

which performs feature selection by making the computer perform the steps of:

preparing a predetermined number of sets for causing the learning patterns to transition according to a plurality of feature values;

deciding a predetermined feature candidate having a largest amount of mutual information from class information of the set of the learning patterns, as a first feature of the feature set, by calculating the feature value of each of the learning patterns corresponding to the feature candidates, adding a weight to each of the learning patterns according to the decided feature, distributing the learning patterns, and causing the learning patterns to transition to set corresponding to the decided feature in sequence, and deciding predetermined feature candidates having a largest amount of mutual information between the feature value of the learning pattern corresponding to the feature candidate and the class information of the learning pattern in sequence, as next features of the feature set, under the condition that information about the set including the learning patterns and the decided features are known; and classifying the learning patterns according to the classification table including the feature values of the learning patterns and class information.

46. The program according to claim 45, wherein each of the feature values of the input patterns calculated by the computer indicates a value of a probability that a feature of a concerned rank becomes a predetermined value, wherein the computer performs judgment by calculating a probability that each feature pattern included in the classification table becomes a value of predetermined class information by using the feature values.

47. A program run by a computer forming a system including pattern input for inputting patterns, feature extraction for extracting features from the patterns, pattern judgment for judging the patterns based on the features, and feature storage for storing and maintaining a decided feature set, wherein the program judges the input patterns based on a set to which the input patterns belong by making the computer perform the steps of:

calculating the feature value of each of the input patterns by using the feature set decided by running the program according to claim 13; and causing the input patterns to transition based on the feature values of the input patterns and a transition table that stores sets to which the learning patterns belong at the time where each feature is decided in sequence by running the program according to claim 13.

48. A program run by a computer forming a system including pattern input for inputting patterns, feature extraction for extracting features from the patterns, pattern judgment for judging the patterns based on the features, and feature storage for storing and maintaining a decided feature set, wherein the program makes the computer perform the steps of:

calculating a feature probability for each of the input patterns, the feature probability indicating a probability that the feature of a concerned rank becomes a predetermined value by using the feature set decided by running the program according to claim 13;

causing the input patterns to transition based on the feature probabilities of the input patterns and a transition table that stores sets to which learning patterns belong at the time where each feature is decided in sequence by running the program according to claim 13: and calculating a probability that each of the input patterns has predetermined class information based on a route of the transition, whereby the input patterns are judged based on a result of the calculation.

49. A pattern learning system for maintaining the program according to claim 13 so that the programs can be run, so as to perform learning-pattern-feature selection.

50. A pattern classification system for maintaining the program according to claim 42 so that the programs can be run, so as to perform learning-pattern classification.

51. A pattern classification system for maintaining the program according to claim 43 so that the programs can be run, so as to perform learning-pattern classification.

52. A pattern judgment system for maintaining the program according to claim 44 so that the programs can be run, so as to perform input-pattern judgment.

53. A pattern judgment system for maintaining the program according to claim 45 so that the programs can be run, so as to perform input-pattern judgment.

54. A pattern judgment system for maintaining the program according to claim 43 so that the programs can be run, so as to perform input-pattern judgment.

55. A pattern judgment system for maintaining the program according to claim 46 so that the programs can be run, so as to perform input-pattern judgment.

56. A pattern judgment system for maintaining the program according to claim 47 so that the programs can be run, so as to perform input-pattern judgment.

57. A pattern judgment system for maintaining the program according to claim 48 so that the programs can be run, so as to perform input-pattern judgment.

58. A program run by a computer forming a system including learning-pattern storage for storing and maintaining learning patterns used for learning, feature-candidate generation for generating a plurality of feature candidates, feature decision for deciding a set of features suitable for pattern identification from among the plurality of feature candidates generated by the feature-candidate generation, feature storage for storing and maintaining the feature set decided by the feature decision, and classification-table generation for generating a classification table, wherein the program performs learning-pattern classification by making the computer perform the steps of:

calculating a feature of each of the learning patterns by using the feature set decided by running the program according to claim 13; and classifying the learning patterns according to the classification table including the feature values of the learning patterns and class information.

59. A feature selection method according to claim 1, wherein the feature decision method further comprises the steps of:

preparing two working sets and the predetermined number of sets each labeled with a predetermined numeric value for causing the learning patterns to transition according to feature values;

distributing each learning pattern to the two working sets with weights determined according to the determined feature, and computes the proportion of target class learning patterns for each working set;

causing the learning patterns in each working set to transition to a set labeled with a numeric value nearest to the proportion;

deciding a predetermined feature candidate having a largest amount of information from the class information under the condition that information about distribution of the learning patterns over the sets and the feature already decided are known as the second feature;

for each of the sets, distributing each of the learning patterns within the set to the two working sets with weights determined according to the determined feature, thereby computing the proportion of target-class-learning patterns for each working set; and deciding a predetermined feature candidate having a largest amount of mutual information from the class information under the condition that information about the distribution of the learning patterns over the sets and the features already decided are known as a next feature in the sequence.

* * * * *

UNITED STATES PATENT AND TRADEMARK OFFICE
CERTIFICATE OF CORRECTION

| | |
|---|---|
| PATENT NO. | : 7,634,140 B2 |
| APPLICATION NO. | : 10/505903 |
| DATED | : December 15, 2009 |
| INVENTOR(S) | : Okajima et al. |

It is certified that error appears in the above-identified patent and that said Letters Patent is hereby corrected as shown below:

Claim 23, Col. 27, line 50, "about die set" should be --about the set--.

Claim 44, Col. 30, line 41, "based or the" should be --based on the--.

Claim 45, Col. 31, line 3, "transition to set" should be --transition to a set--.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,634,140 B2 Page 1 of 1
APPLICATION NO. : 10/505903
DATED : December 15, 2009
INVENTOR(S) : Okajima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Ninth Day of November, 2010

David J. Kappos
*Director of the United States Patent and Trademark Office*